US011858101B2

(12) United States Patent
Saitou et al.

(10) Patent No.: US 11,858,101 B2
(45) Date of Patent: Jan. 2, 2024

(54) DRIVER, STRIKING MECHANISM, AND MOVING MECHANISM

(71) Applicant: KOKI HOLDINGS CO., LTD., Tokyo (JP)

(72) Inventors: Takeshi Saitou, Ibaraki (JP); Tetsuhito Shige, Ibaraki (JP); Daiki Kiyohara, Ibaraki (JP); Masashi Nishida, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 17/980,980

(22) Filed: Nov. 4, 2022

(65) Prior Publication Data

US 2023/0050091 A1 Feb. 16, 2023

Related U.S. Application Data

(63) Continuation of application No. 16/608,093, filed as application No. PCT/JP2018/013672 on Mar. 30, 2018, now Pat. No. 11,491,629.

(30) Foreign Application Priority Data

Apr. 26, 2017 (JP) ................................ 2017-086869
Nov. 24, 2017 (JP) ................................ 2017-225719

(51) Int. Cl.
*B25D 16/00* (2006.01)
*B25C 1/04* (2006.01)
(Continued)

(52) U.S. Cl.
CPC .............. *B25D 16/00* (2013.01); *B25C 1/047* (2013.01); *B25C 1/06* (2013.01); *B25D 9/04* (2013.01); *B25D 2250/371* (2013.01)

(58) Field of Classification Search
CPC ............ B25C 1/04; B25C 1/047; B25D 16/00
See application file for complete search history.

(56) References Cited

U.S. PATENT DOCUMENTS 4,807,793 A 2/1989 Ghibely
5,720,423 A 2/1998 Kondo et al.
(Continued)

FOREIGN PATENT DOCUMENTS

CN 106457539 A 2/2017
DE 102010032401 A1 2/2012
(Continued)

OTHER PUBLICATIONS

Office Action dated Jun. 30, 2022 in German Patent Application No. 11 2018 002 219.6 with English Translation (13 pages).
(Continued)

*Primary Examiner* — Eyamindae C Jallow
(74) *Attorney, Agent, or Firm* — Rimon P.C.

(57) ABSTRACT

A driver capable of suppressing increase in a load torque of a motor when a striking mechanism is moved by the torque of the motor against a force of a first moving mechanism is provided. The driver includes a striking mechanism 12 movable in a first direction B1 and a second direction B2 opposite to the first direction B1 and a first moving mechanism configured to move the striking mechanism 12 in the first direction B1 to strike a fastener, and the driver further includes a motor, a second moving mechanism 45 rotated by the torque of the motor and configured to move the striking mechanism 12 in the second direction against a force of the first moving mechanism, and torque suppression mechanisms 45A to 45H configured to suppress increase in the torque of the motor when the striking mechanism 12 is moved in the second direction B2.

20 Claims, 19 Drawing Sheets

(51) Int. Cl.
*B25C 1/06* (2006.01)
*B25D 9/04* (2006.01)

(56) References Cited

U.S. PATENT DOCUMENTS

| | | | | |
|---|---|---|---|---|
| 5,941,441 | A | 8/1999 | Ilagan | |
| 8,011,547 | B2 * | 9/2011 | Leimbach | B25C 1/06 227/129 |
| 8,763,874 | B2 * | 7/2014 | McCardle | B25C 1/06 227/129 |
| 10,625,407 | B2 | 4/2020 | Sato et al. | |
| 2011/0036885 | A1 * | 2/2011 | Leimbach | B25C 1/041 227/8 |
| 2014/0069671 | A1 * | 3/2014 | Leimbach | B25C 1/041 173/1 |
| 2016/0176032 | A1 * | 6/2016 | Tanji | B25C 1/06 227/146 |
| 2016/0201352 | A1 * | 7/2016 | Mouchet | E04H 17/21 256/24 |
| 2016/0201353 | A1 | 7/2016 | Niekamp | |
| 2016/0288305 | A1 | 10/2016 | McCardle et al. | |
| 2017/0282341 | A1 | 10/2017 | Wolf et al. | |
| 2018/0154505 | A1 | 6/2018 | Sato et al. | |

FOREIGN PATENT DOCUMENTS

| | | | |
|---|---|---|---|
| EP | 3195986 | A1 | 7/2017 |
| JP | 63-174882 | A | 7/1988 |
| JP | H05-269681 | A | 10/1993 |
| JP | 09-094769 | A | 4/1997 |
| JP | 2016-190277 | A | 11/2016 |
| WO | 2016199670 | A1 | 12/2016 |

OTHER PUBLICATIONS

Office Action dated Mar. 28, 2022 in Chinese Patent Application No. 201880028117.7 with English Translation.

Notice of Allowance dated Sep. 26, 2022 in U.S. Appl. No. 16/608,093.

International Search Report issued in corresponding International Patent Application No. PCT/JP2018/013672, dated May 29, 2018, with ENglish translation. .

* cited by examiner

12: STRIKING MECHANISM
45: SECOND MOVING MECHANISM
45A ~ 45H: TORQUE SUPPRESSION MECHANISM
B1: FIRST DIRECTION
B2: SECOND DIRECTION

DRIVER, STRIKING MECHANISM, AND MOVING MECHANISM

CROSS REFERENCE TO RELATED APPLICATIONS

This application is a Continuation of U.S. patent application Ser. No. 16/608,093, filed on Oct. 24, 2019, which is the U.S. National Phase under 35 U.S.C. § 371 of International Patent Application No. PCT/JP2018/013672, filed on Mar. 30, 2018, which claims the benefits of Japanese Patent Application No. 2017-086869, filed on Apr. 26, 2017 and Japanese Patent Application No. 2017-225719, filed on Nov. 24, 2017, the entire contents of which are hereby incorporated by reference.

TECHNICAL FIELD

The present invention relates to a driver in which a striking mechanism is moved to strike a fastener, a striking mechanism, and a moving mechanism.

BACKGROUND ART

Conventionally, a driver in which a striking mechanism is moved to strike a fastener has been known, and the driver is described in Patent Document 1. The driver described in Patent Document 1 includes a housing, a nose portion, a motor case, a pressure accumulation chamber, a striking mechanism, an electric motor, a power conversion mechanism, a speed reducer, and a magazine.

The nose portion is fixed to the housing, the motor case is connected to the housing, and the pressure accumulation chamber is provided in the housing. The striking mechanism is provided in the housing, and the striking mechanism includes a piston and a bit. A first bevel gear is provided to an output shaft of the speed reducer.

The power conversion mechanism is a cam plate provided in the housing, and a second bevel gear is provided to the cam plate. The first bevel gear is meshed with the second bevel gear. The cam plate converts the torque of the electric motor to the moving force of the bit. The cam plate has a plurality of projections. A rack is provided to the bit. The magazine is attached to the housing and contains fasteners. The fastener in the magazine is supplied to the nose portion.

When the electric motor is stopped, the piston is stopped at the bottom dead center by the pressure of the pressure accumulation chamber. When the electric motor is rotated, the torque thereof is transmitted to the cam plate through the speed reducer. When the projections of the cam plate are engaged with the rack, the striking mechanism is moved toward the top dead center against the pressure of the pressure accumulation chamber. When the striking mechanism reaches the top dead center, the projections of the cam plate are released from the rack, the striking mechanism is moved toward the bottom dead center, and the striking mechanism strikes the fastener.

RELATED ART DOCUMENTS

Patent Documents

Patent Document 1: Japanese Patent Application Laid-Open Publication No. 2016-190277

SUMMARY OF THE INVENTION

Problem to be Solved by the Invention

However, since the striking mechanism is moved against the pressure of the pressure accumulation chamber in the driver described in Patent Document 1, the load torque of the motor increases when the striking mechanism is moved from the bottom dead center to the top dead center. Therefore, in the design of the driver, the size of the motor and a driving unit such as a speed reduction gear are selected in accordance with the load amount of the motor when the striking mechanism is near the top dead center. The inventors of the present invention have recognized that it is preferable that the load of the motor when the striking mechanism is moved is uniformized by suppressing the load of the motor when the striking mechanism is near the top dead center in order to reduce the size and weight of the motor.

An object of the present invention is to provide a driver, a striking mechanism, and a moving mechanism capable of suppressing the increase in a load torque of a motor when a striking mechanism is moved by the torque of the motor against a force of a first moving mechanism.

Means for Solving the Problems

The driver according to an embodiment includes a striking mechanism movable in a first direction and a second direction opposite to the first direction and a first moving mechanism configured to move the striking mechanism in the first direction to strike a fastener, and the driver further includes a motor, a second moving mechanism rotated by the torque of the motor and configured to move the striking mechanism in the second direction against a force of the first moving mechanism, and a torque suppression mechanism configured to suppress increase in the torque of the motor when the striking mechanism is moved in the second direction.

Effects of the Invention

A driver according to an embodiment can suppress the increase in the torque of the motor when the striking mechanism is moved in a second direction against the force of the first moving mechanism.

DETAILED DESCRIPTION OF PREFERRED EMBODIMENTS

Figure 1:
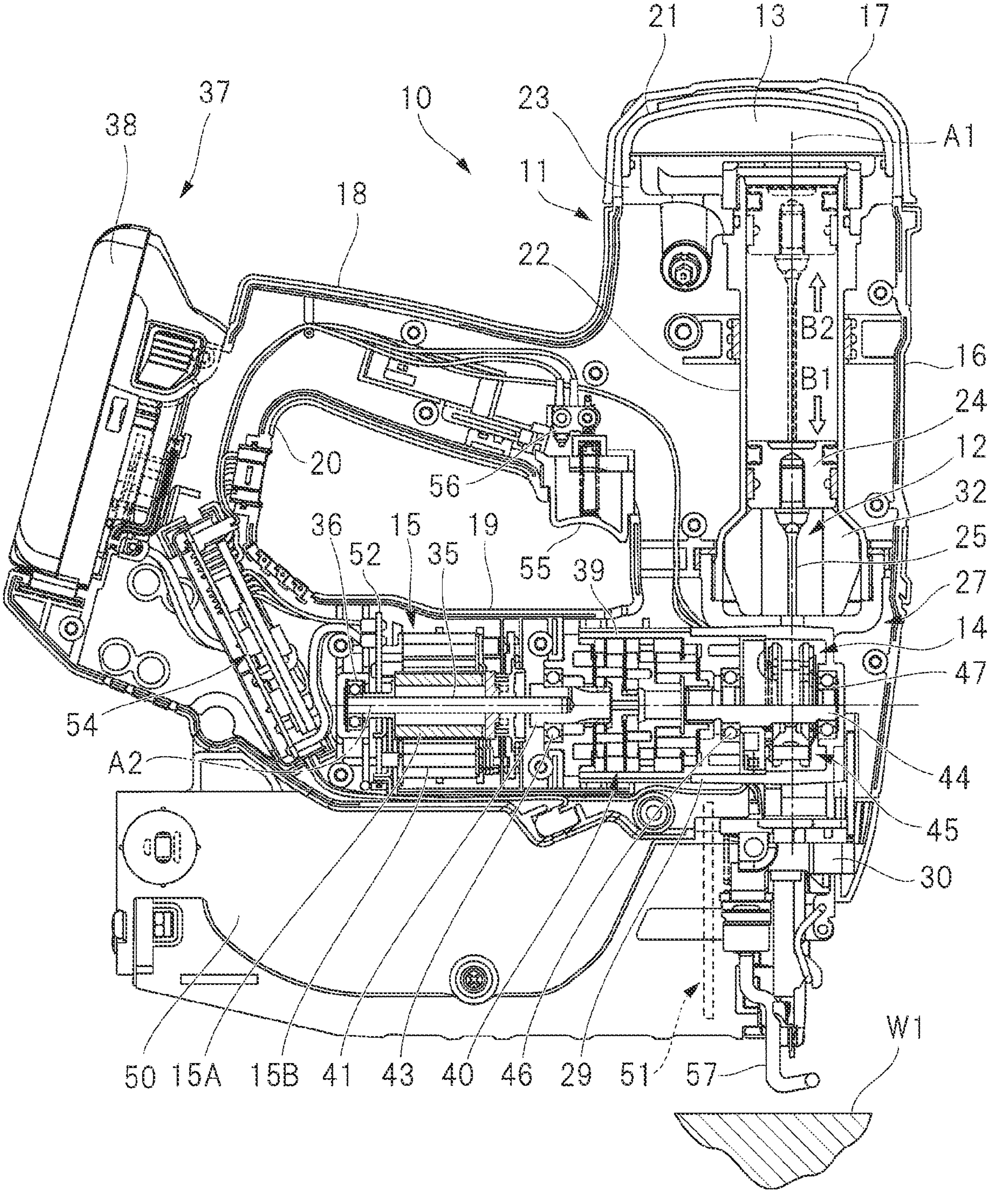
FIG. 1 is an overall cross-sectional view in which a driver according to a first embodiment of the present invention is seen from a side.

Hereinafter, representative embodiments of some embodiments of a driver will be described with reference to the drawings. The same configurations are denoted by the same reference characters throughout the drawings, and the repetitive description thereof will be omitted.

First Embodiment

A driver 10 shown in FIG. 1 includes a housing 11, a striking mechanism 12, a pressure chamber 13, a power conversion mechanism 14, and an electric motor 15. The striking mechanism 12 is disposed from the inside to the outside of the housing 11. The pressure chamber 13 moves the striking mechanism 12 from the top dead center to the bottom dead center in a first direction B1. The power conversion mechanism 14 moves the striking mechanism 12 in a second direction B2 opposite to the first direction B1. The torque of the electric motor 15 is transmitted to the power conversion mechanism 14.

The housing 11 has a main body 16, a cover 17, a handle 18, a motor case 19, and a connecting portion 20. The cover 17 closes an opening of the main body 16. The handle 18 and the motor case 19 are connected to the main body 16. The handle 18 and the motor case 19 are connected to the connecting portion 20. A pressure accumulation container 21 and a cylinder 22 are provided in the housing 11, and an annular connector 23 connects the pressure accumulation container 21 and the cylinder 22. The pressure chamber 13 is formed in the pressure accumulation container 21.

Figure 2:
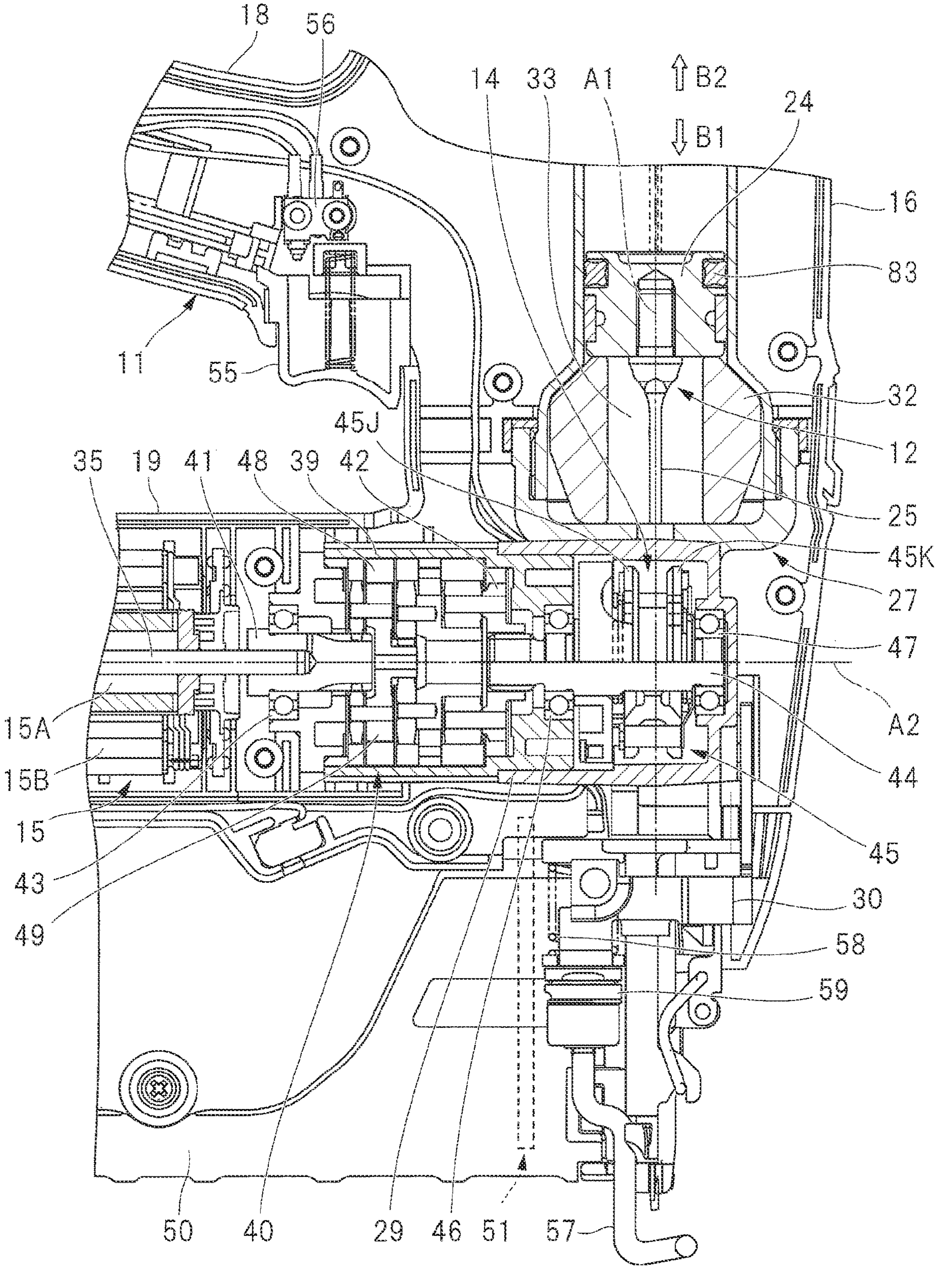
FIG. 2 is a partial cross-sectional view in which the driver is seen from a side.

The striking mechanism 12 includes a piston 24 and a driver blade 25. The piston 24 is movable in the cylinder 22 in a direction of a center line A1 of the cylinder 22. The driver blade 25 is fixed to the piston 24. The direction of the center line A1 is parallel to the first direction B1 and the second direction B2. As shown in FIG. 2, a sealing member 83 is attached to an outer circumference of the piston 24, and the sealing member 83 is in contact with an inner surface of the cylinder to form a sealing surface. The sealing member 83 air-tightly seals the pressure chamber 13 shown in FIG. 1.

A compressed gas is held in the pressure chamber 13. Examples of the gas held in the pressure chamber 13 include inert gas such as nitrogen gas, noble gas or others in addition to air. In this embodiment, an example in which air is held in the pressure chamber 13 will be described.

Figure 3:
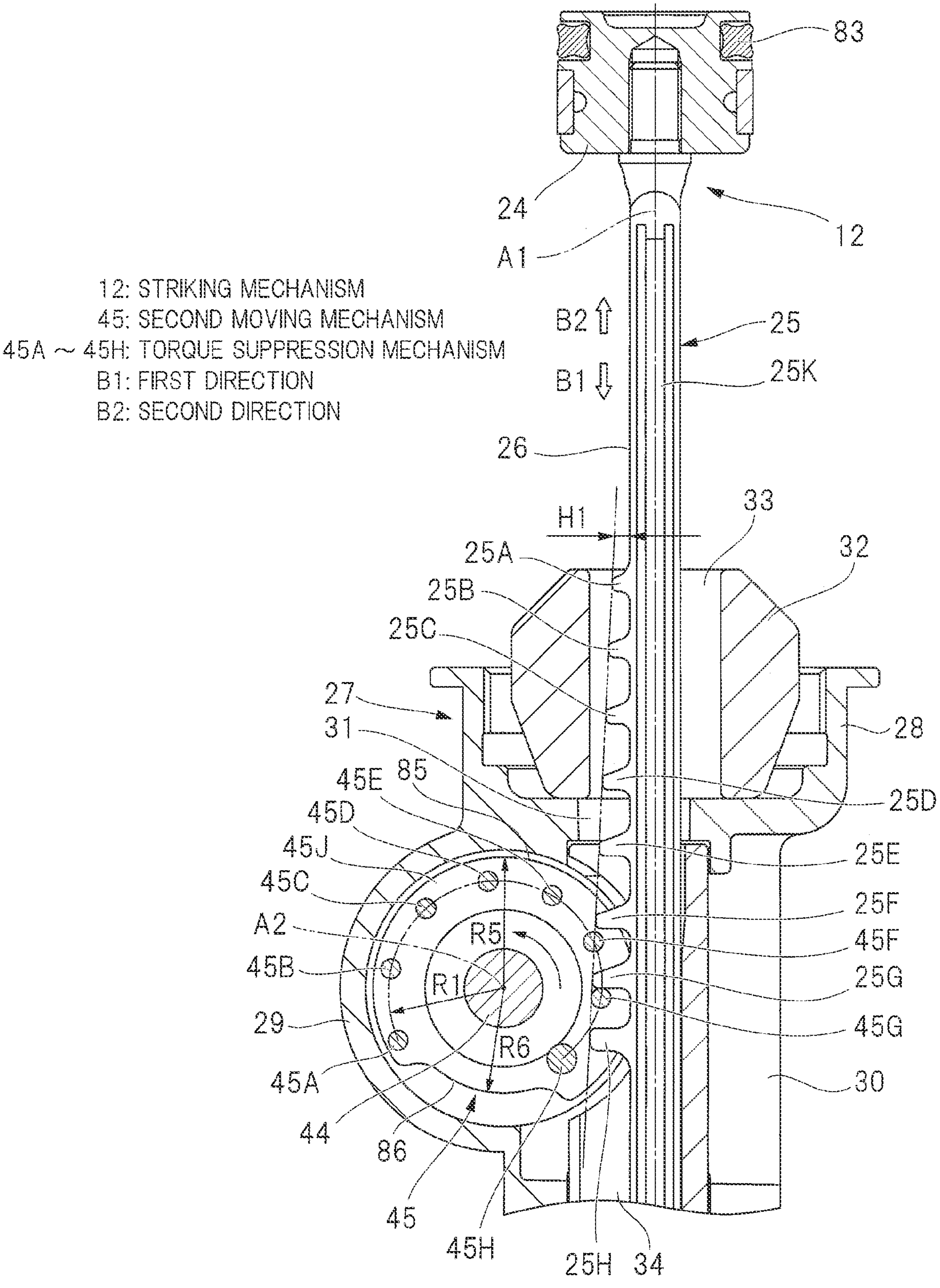
FIG. 3 is a cross-sectional view showing a specific example of a pin wheel and a driver blade provided in the driver.
Figure 4:
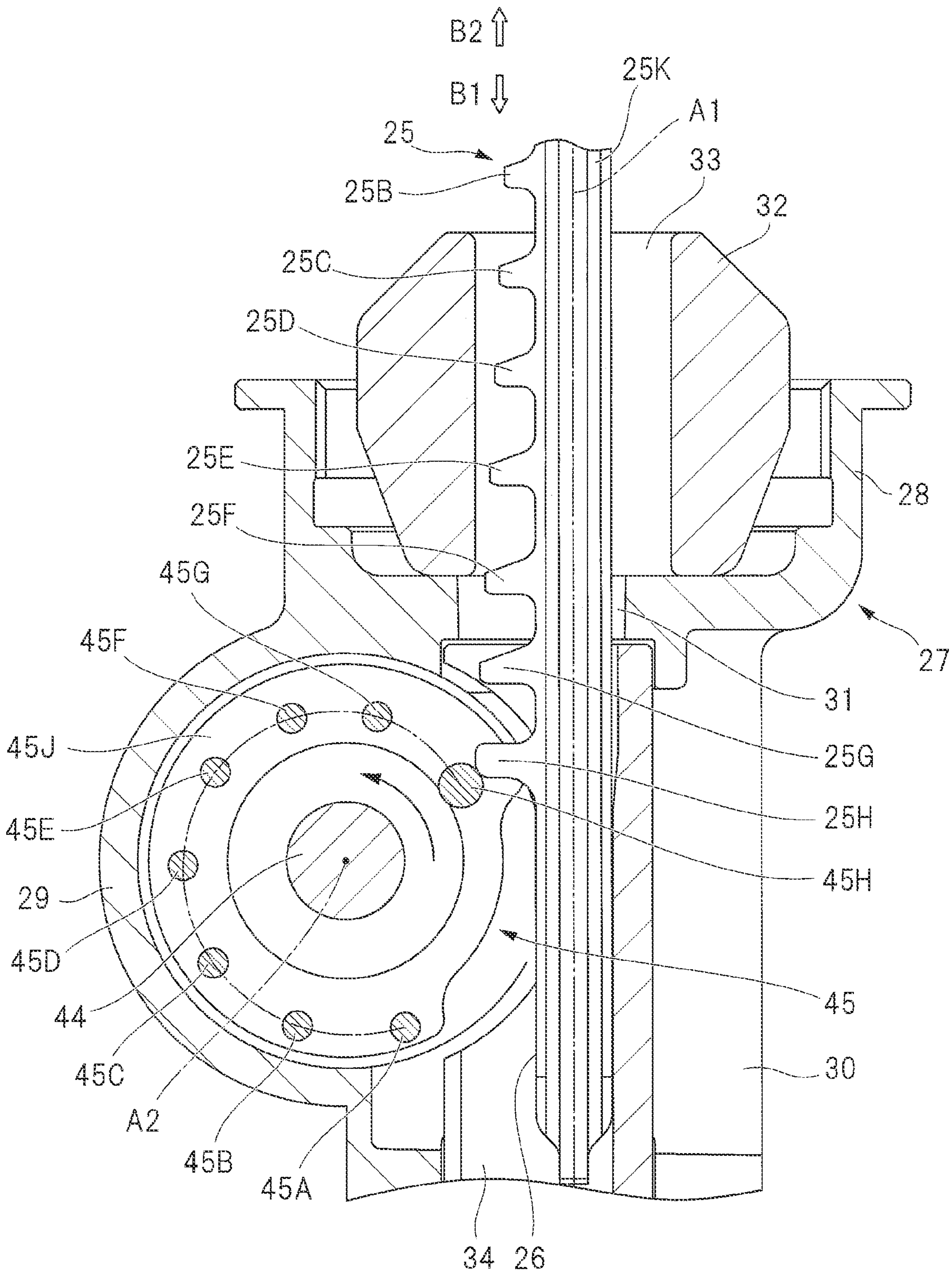
FIG. 4 is a cross-sectional view showing the specific example of the pin wheel and the driver blade provided in the driver.
Figure 5:
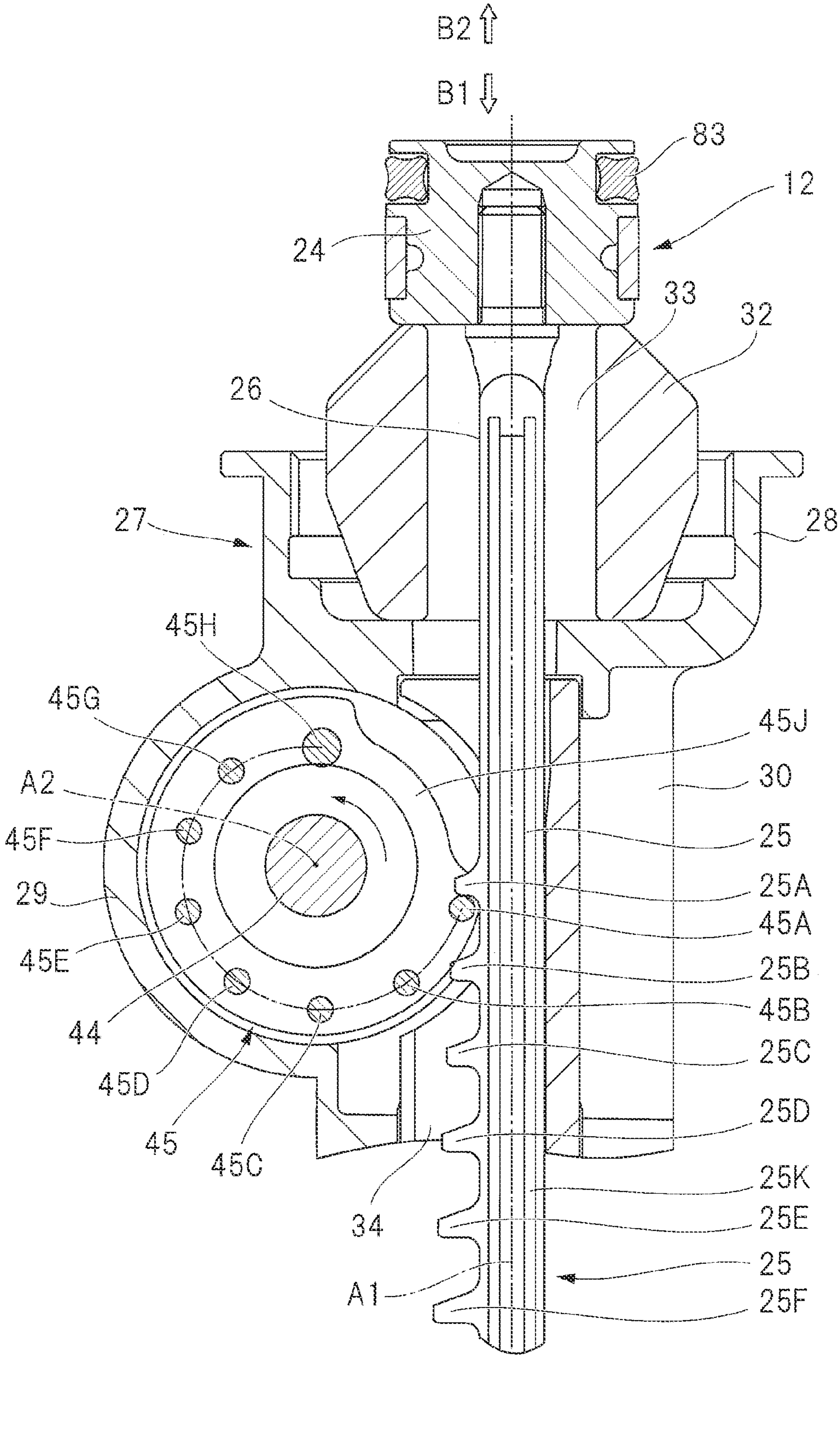
FIG. 5 is a cross-sectional view showing the specific example of the pin wheel and the driver blade provided in the driver.

The driver blade 25 is made of metal. As shown in FIG. 3, FIG. 4, and FIG. 5, the driver blade 25 has a plate-shaped main body portion 25K and a plurality of convex portions 25A to 25H provided to the main body portion 25K. The driver blade 25 is movable in the direction of the center line A1. The plurality of convex portions 25A to 25H are provided in a moving direction of the driver blade 25. The plurality of convex portions 25A to 25H are arranged at constant intervals in the direction of the center line A1. In this embodiment, eight convex portions 25A to 25H are provided to the driver blade 25. The convex portions 25A to 25H protrude from an edge 26 of the driver blade 25. The direction in which the convex portions 25A to 25H protrude from the edge 26 is a direction intersecting with the center line A1.

The convex portions 25A to 25H are sequentially arranged in the direction of the center line A1. The convex portion 25A is arranged at the position where the distance from the piston 24 in the direction of the center line A1 is smallest, and the convex portion 25H is arranged at the position where the distance from the piston 24 is largest. Protrusion amounts H1 from the edge 26 to respective tips of the convex portions 25A to 25H differ in each of the convex portions 25A to 25H. The protrusion amount H1 of the convex portion 25A having the smallest distance from the piston 24 in the direction of the center line A1 is smallest, and the protrusion amounts H1 of the convex portions 25A to 25H gradually increase as the distance from the piston 24 increases.

A holder 27 is disposed from the inside to the outside of the main body 16. The holder 27 is made of aluminum alloy or synthetic resin. The holder 27 has a cylindrical load receiving portion 28, an arc-shaped cover 29 continuous to the load receiving portion 28, and a nose portion 30 continuous to the load receiving portion 28. The nose portion 30 has an injection path 34. A part of the nose portion 30 is disposed outside the housing 11.

The load receiving portion 28 is disposed in the main body 16, and the load receiving portion 28 has a shaft hole 31. A bumper 32 is provided in the load receiving portion 28. The bumper 32 is integrally formed of a rubber-like elastic material. The bumper 32 has a shaft hole 33. The shaft holes 31 and 33 are connected, and the driver blade 25 is movable in the direction of the center line A1 in the shaft holes 31 and 33 and the injection path 34.

As shown in FIG. 1, the electric motor 15 is provided in the motor case 19. The electric motor 15 includes a rotor 15A and a stator 15B, and the rotor 15A is fixed to a motor shaft 35. The motor shaft 35 is rotatably supported by a bearing 36. The motor shaft 35 is rotatable about an axis line A2. A storage battery 37 detachably attached to the connecting portion 20 is provided, and the storage battery 37 supplies power to the electric motor 15.

The storage battery 37 includes a container case 38 and a battery cell contained in the container case 38. The battery cell is a secondary battery that can be charged and discharged, and any of a lithium ion battery, a nickel hydride battery, a lithium ion polymer battery, and a nickel cadmium battery can be used as the battery cell. The storage battery 37 is a DC power source. A first terminal is provided in the container case 38, and the first terminal is connected to the battery cell. When a second terminal is fixed to the connecting portion 20 and the storage battery 37 is attached to the connecting portion 20, the first terminal and the second terminal are connected so as to allow a current to flow therebetween.

As shown in FIG. 2, a gear case 39 is provided in the housing 11 so as to be unable to rotate. A speed reducer 40 is provided in the gear case 39. The speed reducer 40 includes an input member 41, an output member 42, and three pairs of planetary gear mechanisms. The input member 41 is fixed to the motor shaft 35. The input member 41 is rotatably supported by a bearing 43. The input member 41 and the output member 42 are rotatable about the axis line A2. A rotational force of the motor shaft 35 is transmitted to the output member 42 through the input member 41. The speed reducer 40 reduces a rotation speed of the output member 42 with respect to the input member 41.

As shown in FIG. 2, the power conversion mechanism 14 is disposed in the cover 29. The power conversion mechanism 14 converts a rotational force of the output member 42 to a moving force of the striking mechanism 12. The power conversion mechanism 14 includes a pin wheel shaft 44 integrally rotating with the output member 42, a pin wheel 45 fixed to the pin wheel shaft 44, and a plurality of pins 45A to 45H provided to the pin wheel 45. The pin wheel 45 includes plates 45J and 45K. The plates 45J and 45K are disposed in parallel to each other at an interval in a direction of the axis line A2. The plurality of pins 45A to 45H are disposed between the plates 45J and 45K.

The pin 45A can be engaged with and released from the convex portion 25A, the pin 45B can be engaged with and released from the convex portion 25B, and the pin 45C can be engaged with and released from the convex portion 25C. The pin 45D can be engaged with and released from the convex portion 25D, and the pin 45E can be engaged with and released from the convex portion 25E. The pin 45F can be engaged with and released from the convex portion 25F, and the pin 45G can be engaged with and released from the convex portion 25G. The pin 45H can be engaged with and released from the convex portion 25H.

The pin wheel shaft 44 is rotatably supported by bearings 46 and 47. The pin wheel shaft 44 is rotatable about the axis line A2. As shown in FIG. 3 to FIG. 5, the axis line A2 and the center line A1 do not intersect with each other in plan view perpendicular to the axis line A2.

As shown in FIG. 3, a plurality of pins, that is, the eight pins 45A to 45H are arranged at intervals in a rotation direction of the pin wheel 45. Radii R1 from respective centers of the eight pins 45A to 45H to the axis line A2 are different from each other in a radial direction of the pin wheel 45. A first region 85 and a second region 86 disposed in different regions in the rotation direction are provided on an outer circumference of the pin wheel 45. The first region 85 is provided in a range of about 270 degrees in the rotation direction of the pin wheel 45, and the second region 86 is provided in a range of about 90 degrees in the rotation direction of the pin wheel 45. The first region 85 has a constant radius R5. A radius R6 of the second region 86 is not constant. The radius R5 is larger than the radius R6. Namely, the second region 86 is formed by cutting a part of the pin wheel 45 in the rotation direction. The eight pins 45A to 45H are provided at positions corresponding to the first region 85 in the rotation direction of the pin wheel 45.

The radius R1 from the center of the pin 45A located at the front in the rotation direction of the pin wheel 45 among the eight pins 45A to 45H to the axis line A2 is largest. The radii R1 decrease as approaching to the pin 45H located at the back in the rotation direction of the pin wheel 45. In the embodiment shown in FIG. 3 to FIG. 5, the radii R1 from respective centers of the pins 45A to 45H to the axis line A2 are all different from each other. When the pin wheel 45 is rotated, a moving range of the eight pins 45A to 45H about the axis line A2 is present outside a moving range of the edge 26 of the driver blade 25.

A rotation restricting mechanism 48 is provided in the gear case 39. The rotation restricting mechanism 48 is disposed in a power transmission path between the input member 41 and the output member 42. The rotation restricting mechanism 48 is a rolling element, for example, a roller or a ball. The rotation restricting mechanism 48 is disposed between a rotational element of the planetary gear mechanism, for example, a carrier 49 and the gear case 39.

When the torque in the first direction is transmitted from the electric motor 15 to the carrier 49, the rotation restricting mechanism 48 allows the pin wheel 45 to rotate in a counterclockwise direction in FIG. 3 by the torque. When the torque in the clockwise direction in FIG. 3 is applied from the driver blade 25 to the pin wheel 45, so that the torque is transmitted to the carrier 49 and the torque in the second direction is applied, the rotation restricting mechanism 48 bites between the carrier 49 and the gear case 39 and prevents the pin wheel 45 from rotating in the clockwise direction in FIG. 3.

Also, as shown in FIG. 1, the magazine 50 is supported by the nose portion 30 and the housing 11. Nails 51 are contained in the magazine 50. A plurality of nails 51 are coupled by a connecting element such as a wire or an adhesive. The magazine 50 includes a feed mechanism, and the feed mechanism supplies the nail 51 in the magazine 50 to the injection path 34.

Figure 6:
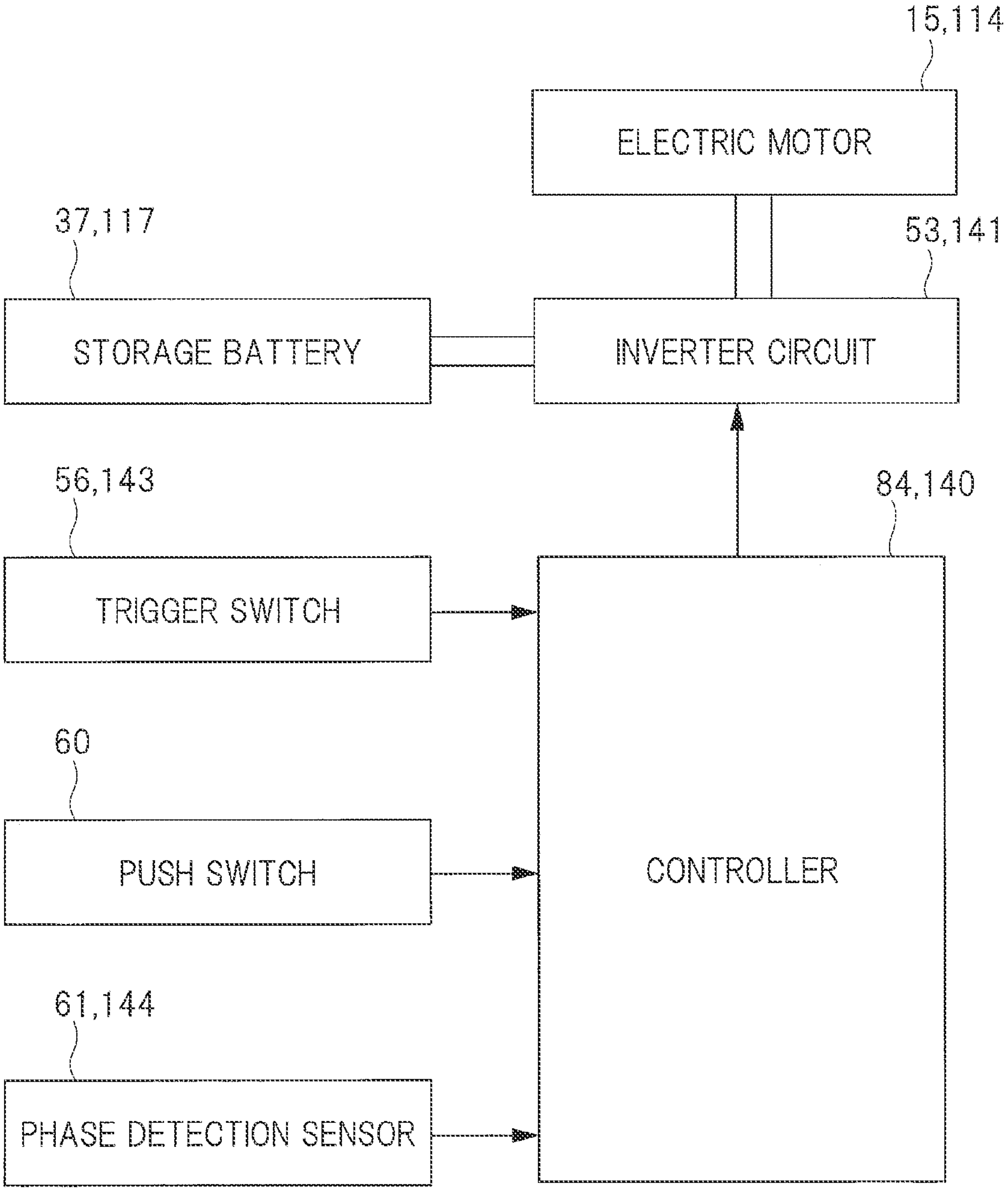
FIG. 6 is a block diagram showing a control system of the driver.

A motor board 52 is provided in the motor case 19, and an inverter circuit 53 shown in FIG. 6 is provided on the motor board 52. The inverter circuit 53 includes a plurality of switching elements and each of the plurality of switching elements can be individually switched on and off.

As shown in FIG. 1, a control board 54 is provided in the housing 11 and a controller 84 shown in FIG. 6 is provided on the control board 54. The controller 84 is a microcomputer including an input port, an output port, a central processing unit, and a memory device.

As shown in FIG. 1, a trigger 55 is provided to the handle 18. The trigger 55 is movable with respect to the handle 18. A trigger switch 56 is provided in the handle 18, and the trigger switch 56 is turned on when an operation force is applied to the trigger 55 and is turned off when the operation force is released.

As shown in FIG. 2, a push lever 57 is attached to the nose portion 30. The push lever 57 is movable in the direction of the center line A1 with respect to the nose portion 30. An elastic member 58 configured to bias the push lever 57 in the direction of the center line A1 is provided. The elastic member 58 is a compression coil spring made of metal, and the elastic member 58 biases the push lever 57 in the direction away from the bumper 32. A push lever stopper 59 is provided to the nose portion 30, and the push lever 57 biased by the elastic member 58 is stopped while being in contact with the push lever stopper 59.

A push switch 60 shown in FIG. 6 is provided. The push switch 60 is turned on when the push lever 57 is pressed to a workpiece W1 and is moved in the direction approaching to the bumper 32 by a predetermined amount. The push switch 60 is turned off when the force to press the push lever 57 to the workpiece W1 is released. A phase detection sensor 61 configured to detect a rotation angle, that is, a phase of the pin wheel 45 is provided. A signal of the trigger switch 56, a signal of the push switch 60, and a signal of the phase detection sensor 61 are input to the controller 84.

A work example in which a worker uses the driver 10 and a control example performed by the controller 84 are as follows. The controller 84 determines whether the conditions to strike the nail 51 are satisfied or not. When the controller 84 detects at least one of the trigger switch 56 being turned off and the push switch 60 being turned off, the controller 84 determines that the conditions to strike the nail 51 are not satisfied and turns off all of the switching elements of the inverter circuit 53. Therefore, the power of the storage battery 37 is not supplied to the electric motor 15 and the electric motor 15 is stopped.

In addition, as shown in FIG. 3, the pin 45G and the convex portion 25G are engaged with each other and the striking mechanism 12 is stopped at the standby position. When the striking mechanism 12 is at the standby position, the piston 24 is separated from the bumper 32. When the striking mechanism 12 is stopped at the standby position, the tip of the driver blade 25 is located between a head of the nail 51 and the tip of the nose portion 30 in the direction of the center line A1. When the striking mechanism 12 is stopped at the standby position and the push lever 57 is separated from the workpiece W1 as shown in FIG. 1, the push lever 57 is stopped while being in contact with the push lever stopper 59.

Further, the controller 84 detects that the striking mechanism 12 is located at the standby position based on the signal output from the phase detection sensor 61, and the controller 84 stops the electric motor 15. The rotation restricting mechanism 48 makes the striking mechanism 12 stop at the standby position when the electric motor 15 is stopped. The striking mechanism 12 receives the biasing force of the pressure chamber 13, and the biasing force received by the striking mechanism 12 is transmitted to the pin wheel shaft 44 through the pin wheel 45. Therefore, the pin wheel shaft 44 receives the torque in the clockwise direction in FIG. 3. The torque received by the pin wheel shaft 44 is transmitted to the carrier 49, and the rotation restricting mechanism 48 bites between the carrier 49 and the gear case 39. Therefore, the rotation of the pin wheel shaft 44 in the clockwise direction in FIG. 3 is prevented, and the striking mechanism 12 is stopped at the standby position in FIG. 3.

When the controller 84 detects that the trigger switch 56 is turned on and the push switch 60 is turned on, the controller 84 determines that the conditions to strike the nail 51 are satisfied and repeats the control to turn on and off the switching elements of the inverter circuit 53, thereby supplying the power of the storage battery 37 to the electric motor 15. Then, the motor shaft 35 of the electric motor 15 is rotated. The torque of the motor shaft 35 is transmitted to the pin wheel shaft 44 through the speed reducer 40.

The pin wheel 45 is rotated in the counterclockwise direction in FIG. 3, the striking mechanism 12 is moved from the standby position in the second direction B2 against the force of the pressure chamber 13, and the air pressure in the pressure chamber 13 increases. The movement of the striking mechanism 12 in the second direction B2 means that the striking mechanism 12 rises in FIG. 1. Further, after the pin 45H is engaged with the convex portion 25H, the pin 45G is released from the convex portion 25G. When the striking mechanism 12 reaches the top dead center as shown in FIG. 4, the tip of the driver blade 25 is located at the position higher than the head of the nail 51. Also, after the striking mechanism 12 reaches the top dead center, the pin 45H is released from the convex portion 25H. Then, the striking mechanism 12 is moved in the first direction B1 by the air pressure of the pressure chamber 13. The movement of the striking mechanism 12 in the first direction B1 means that the striking mechanism 12 falls in FIG. 1. The driver blade 25 strikes the nail 51 in the injection path 34, and the nail 51 is driven into the workpiece W1.

In addition, when the whole of the nail 51 is driven into the workpiece W1 and the nail 51 is stopped, the tip of the driver blade 25 is separated from the nail 51 by the reaction force. Further, the piston 24 collides with the bumper 32 as shown in FIG. 5, and the kinetic energy of the striking mechanism 12 is absorbed by the elastic deformation of the bumper 32. The position of the striking mechanism 12 when the piston 24 collides with the bumper 32 is the bottom dead center.

Further, the motor shaft 35 of the electric motor 15 is rotated even after the driver blade 25 strikes the nail 51. Then, when the pin 45A is engaged with the convex portion 25A, the striking mechanism 12 rises again in FIG. 1. When the controller 84 detects that the striking mechanism 12 reaches the standby position of FIG. 3, the controller 84 stops the electric motor 15. When the electric motor 15 is stopped, the rotation restricting mechanism 48 holds the striking mechanism 12 at the standby position.

In this embodiment, from the state where the striking mechanism 12 is at the bottom dead center, the pin 45A is engaged with the convex portion 25A, the pin 45B is engaged with the convex portion 25B, the pin 45C is engaged with the convex portion 25C, the pin 45D is engaged with the convex portion 25D, the pin 45E is engaged with the convex portion 25E, the pin 45F is engaged with the convex portion 25F, the pin 45G is engaged with the convex portion 25G, and the pin 45H is engaged with the convex portion 25H, whereby the striking mechanism 12 reaches the top dead center. Note that, since two pairs of pins and convex portions are engaged, when the next pin and convex portion are engaged, the pin and convex portion engaged earlier are released.

In this embodiment, the radii R1 are sequentially shortened as the pins to transmit the torque of the pin wheel 45 to the striking mechanism 12 are changed by the rotation of the pin wheel 45. Therefore, when the striking mechanism 12 rises by the torque of the pin wheel 45, the radii R1 corresponding to the arm of the moment are shortened as the striking mechanism 12 approaches to the top dead center. Accordingly, it is possible to suppress the increase in the load torque of the pin wheel 45, that is, the load torque of the electric motor 15 as the striking mechanism 12 approaches to the top dead center. The load torque is a torque necessary for raising the striking mechanism 12.

In this embodiment, in order to suppress the increase in the load torque of the electric motor 15, it is also possible to respectively set the radii R1 from the respective centers of the pins 45A to 45H to the axis line A2 in accordance with the increase amount of the load torque when the striking mechanism 12 is moved in the direction approaching to the top dead center.

In this embodiment, the radii R1 from the axis line A2 to the respective centers of the pins 45A to 45H are made different from each other. The radius R5 of the first region 85 of the pin wheel 45 is larger than the radius R6 of the second region 86. Also, the pin wheel 45 is preferably made of a metal material having a higher mass or a higher specific gravity compared with a resin or a carbon-based material. In particular, it is preferable that a material having a higher mass or a material having a higher mass and a higher specific gravity than the material of the second region 86 is used as the material of the first region 85 of the pin wheel 45.

This is due to the following reason. When the pin wheel 45 is rotated in order to raise the striking mechanism 12, the moment of inertia in the rotation direction acts on the pin wheel 45. Thus, by rotating the pin wheel 45 at high speed when the load of the electric motor 15 is light, for example, when the striking mechanism 12 is near the bottom dead center, the moment of inertia can be accumulated in the pin wheel 45 by the material having high mass of the first region 85 of the pin wheel 45.

Further, in the region where the load of the electric motor 15 is high and the rotation of the electric motor 15 is low because the striking mechanism 12 is near the top dead center or the region where the electric motor 15 is stopped, the load torque of the electric motor 15 can be further decreased by using the moment of inertia accumulated in the pin wheel 45.

Namely, in the rotation direction of the first region 85 of the pin wheel 45, the pins 45A to 45H are arranged toward the inner side gradually in the radial direction, and thus the first region 85 of the pin wheel 45 is intentionally made of a material having a high mass. Therefore, the load torque of the electric motor 15 can be further decreased by the flywheel effect.

Also, the protrusion amounts H1 of the eight convex portions 25A to 25H provided to the driver blade 25 are gradually shortened as approaching to the piston 24. Therefore, it is possible to smoothly engage and release the pins and the convex portions.

Figure 7:
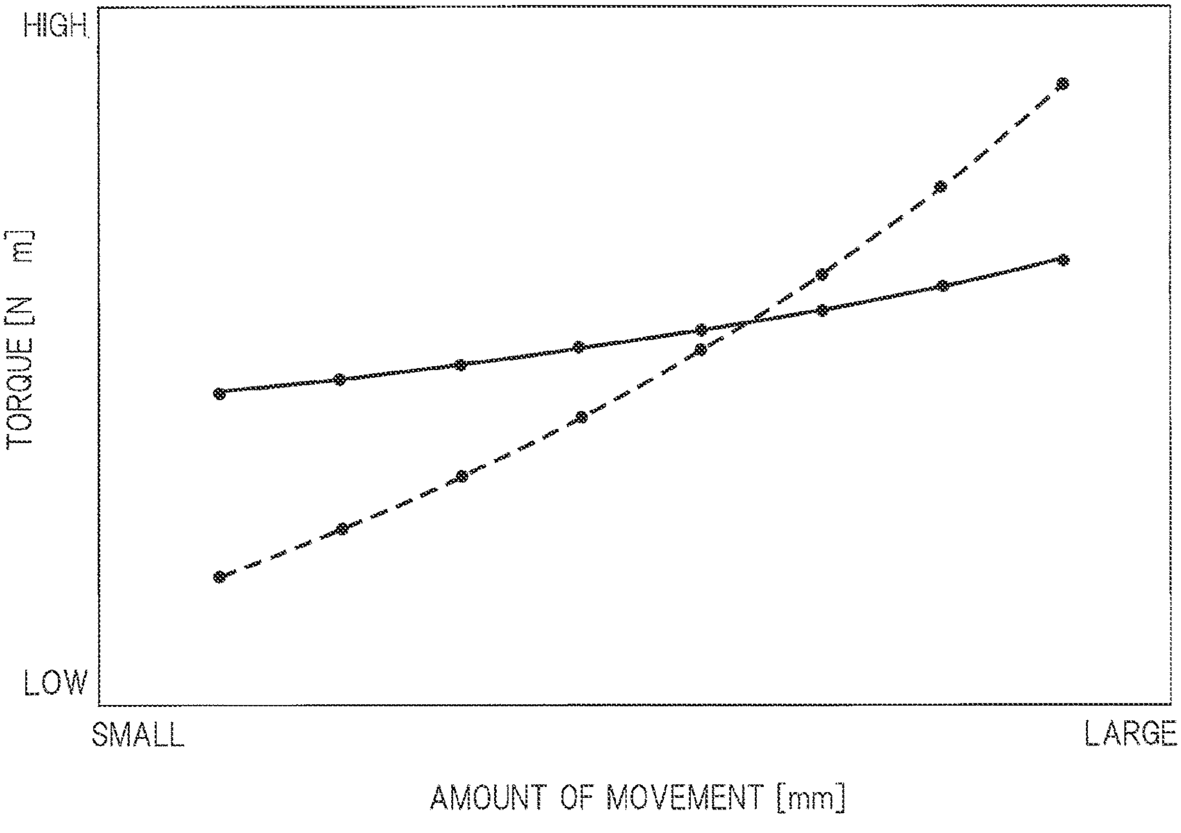
FIG. 7 is a line diagram showing a relationship between the load torque of the electric motor and the amount of movement of the striking mechanism.

FIG. 7 is an example of the characteristic showing the relationship between the load torque of the electric motor and the amount of movement of the striking mechanism. The amount of movement of the striking mechanism is the amount of movement from the standby position to the top dead center. The characteristic indicated by a solid line is the embodiment and the characteristic indicated by a broken line is the comparative example. It is supposed that the distance from the axis line to the centers of the pins is constant in the pin wheel of the comparative example. The increase amount of the load torque in the embodiment is smaller than the increase amount of the load torque in the comparative example. The increase amount of the load torque means the increase ratio of the load torque or the increase rate of the load torque.

Figure 8:
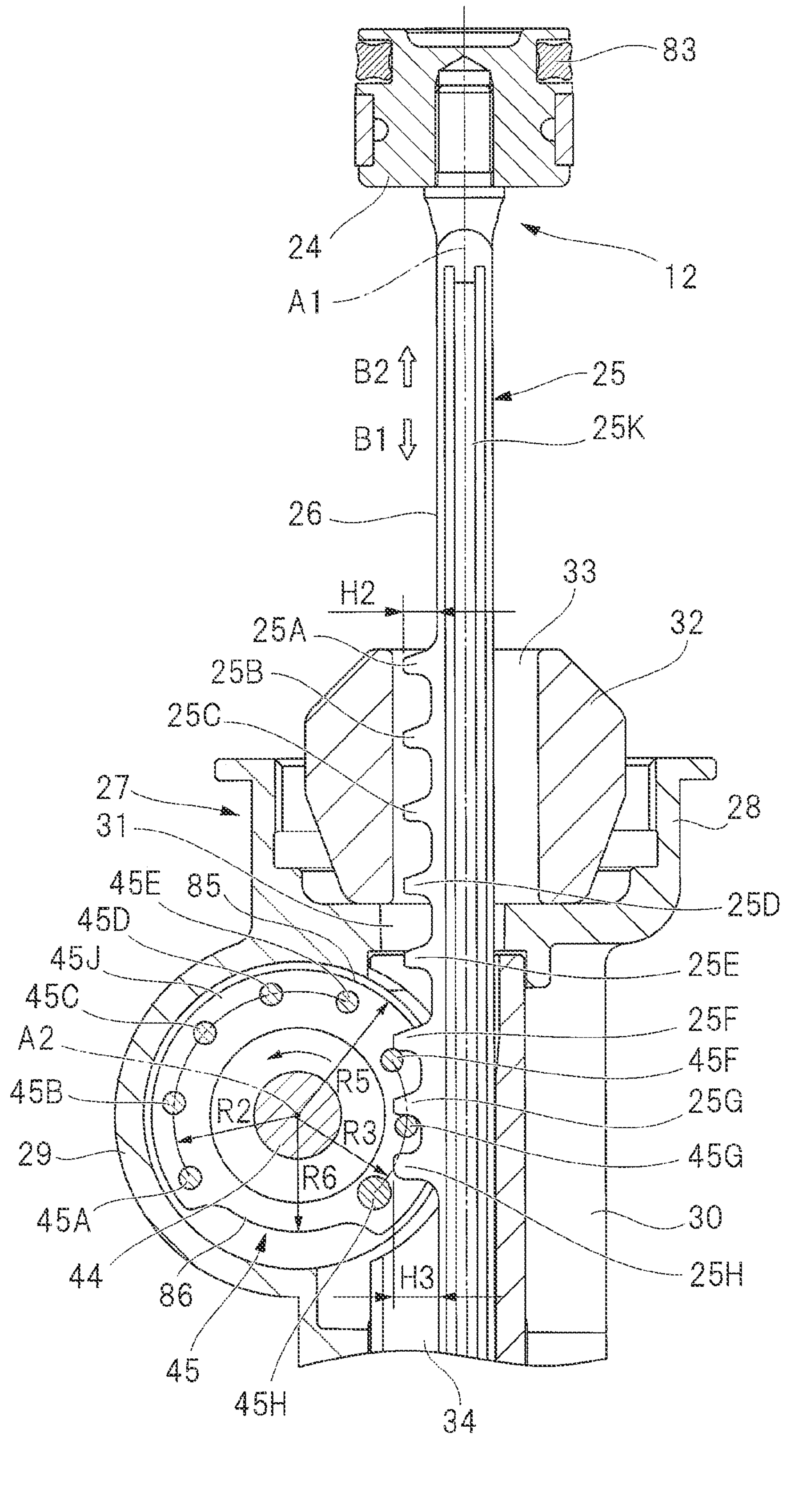
FIG. 8 is a cross-sectional view showing another specific example of a pin wheel and a driver blade provided in the driver.
Figure 9:
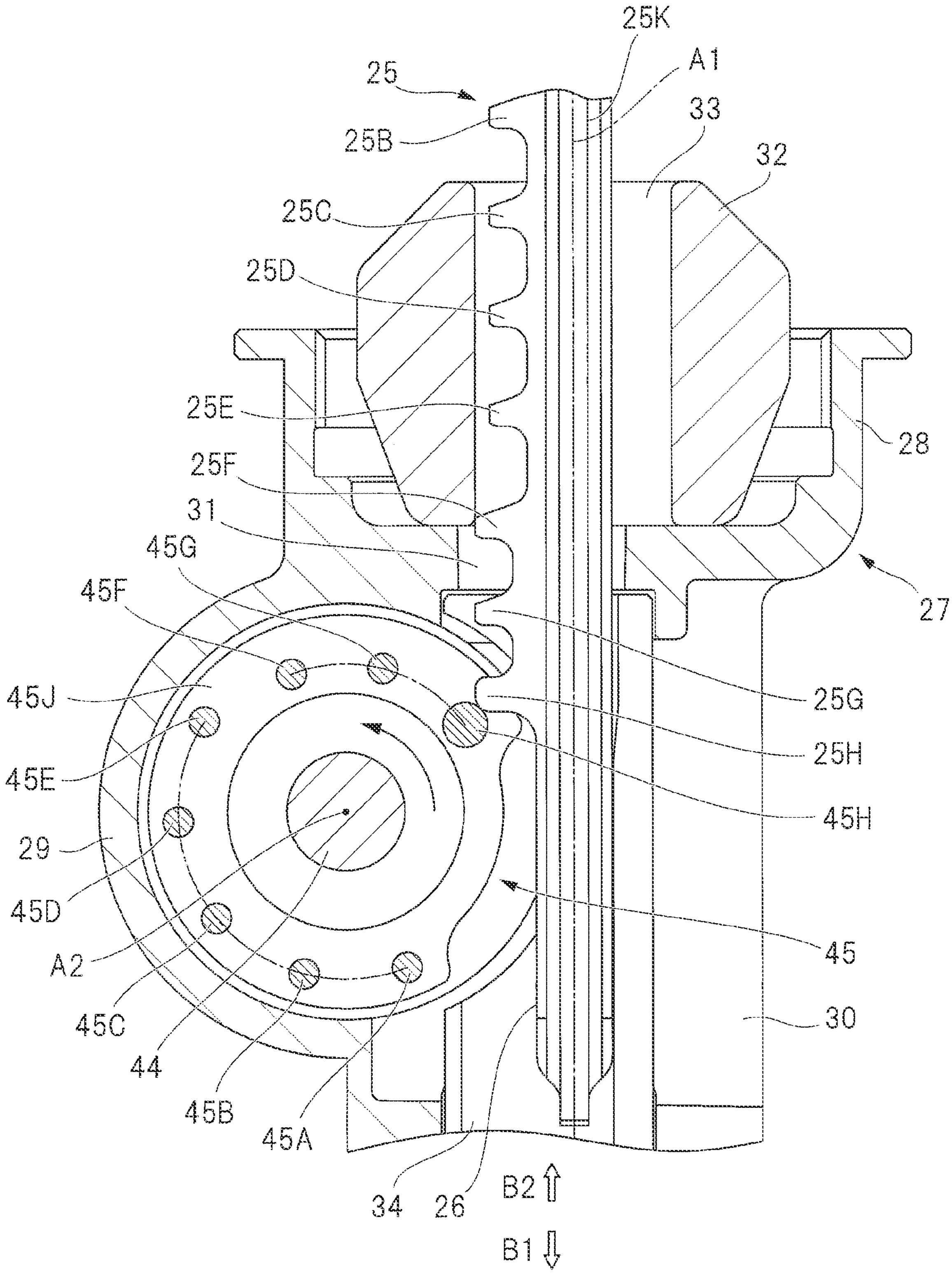
FIG. 9 is a cross-sectional view showing the specific example of the pin wheel and the driver blade provided in the driver.
Figure 10:
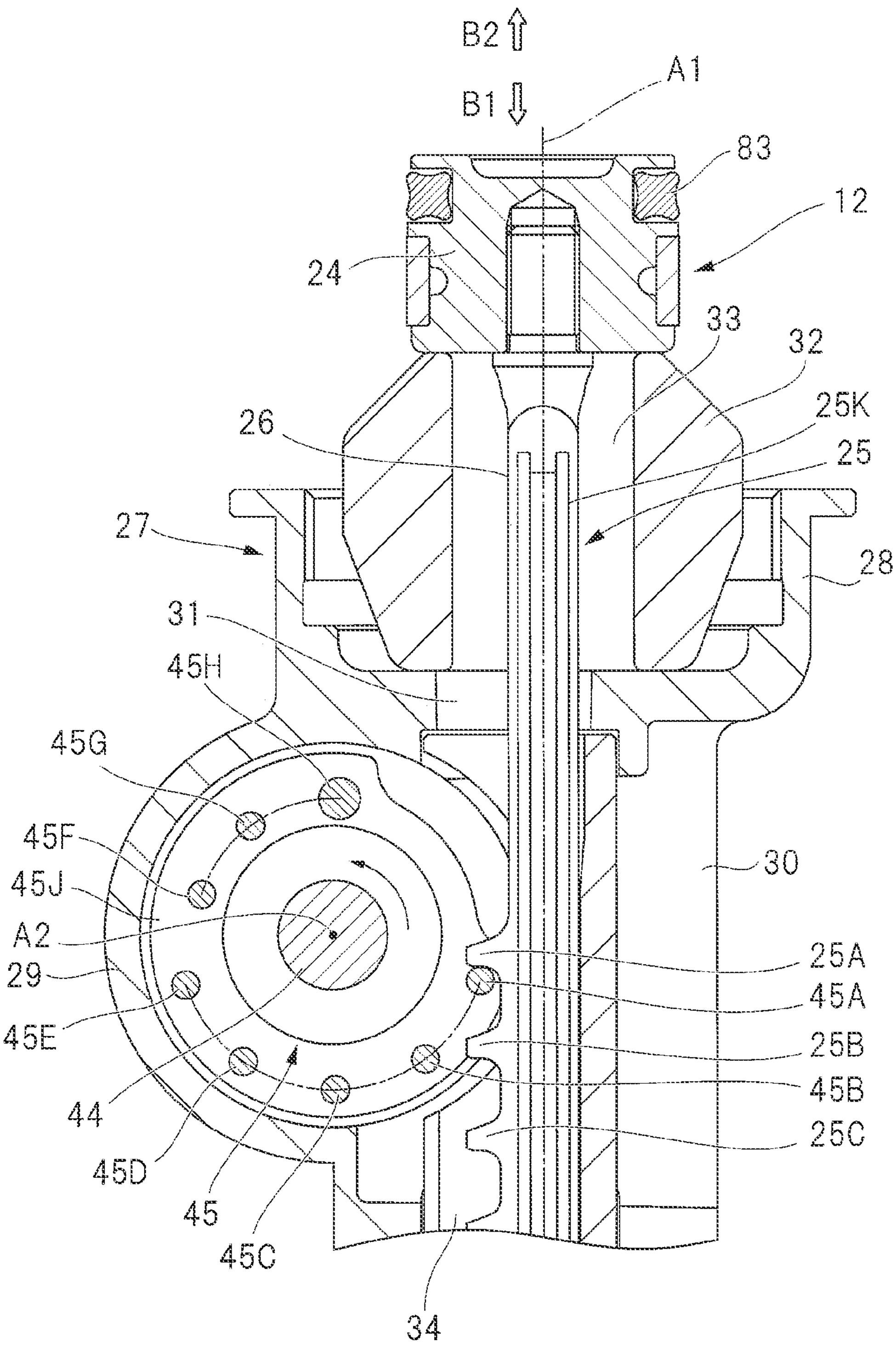
FIG. 10 is a cross-sectional view showing the specific example of the pin wheel and the driver blade provided in the driver.

Another example of the pin wheel 45 and the driver blade 25 will be described with reference to FIG. 8 to FIG. 10. Radii R2 from respective centers of the pins 45A to 45E to the axis line A2 are all the same. Radii R3 from respective centers of the pins 45F to 45H to the axis line A2 are all the same. The radius R3 is smaller than the radius R2.

Protrusion amounts H2 of respective convex portions 25A to 25E provided to the driver blade 25 are all the same. Protrusion amounts H3 of respective convex portions 25F to 25H are all the same. The protrusion amount H2 is smaller than the protrusion amount H3. In the example shown in FIG. 8, FIG. 9, and FIG. 10, the pin 45F is engaged with and released from the convex portion 25F, the pin 45G is engaged with and released from the convex portion 25G, and the pin 45H is engaged with the convex portion 25H during the period when the striking mechanism 12 is moved from the standby position to the top dead center. In the example shown in FIG. 8, FIG. 9, and FIG. 10, the pins 45A to 45E are engaged with and released from the convex portions 25A to 25E during the period when the striking mechanism 12 is moved from the bottom dead center to the standby position.

Therefore, the radii R3 corresponding to the pins 45F to 45H to transmit the torque during the period when the striking mechanism 12 is moved from the standby position to the top dead center are shorter than the radii R2 corresponding to the pins 45A to 45E to transmit the torque during the period when the striking mechanism 12 is moved from the bottom dead center to the standby position. Therefore, it is possible to suppress the load torque during the period when the striking mechanism 12 is moved from the standby position to the top dead center from being increased in comparison with the load torque during the period when the striking mechanism 12 is moved from the bottom dead center to the standby position.

Still another example of the pin wheel 45 and the driver blade 25 will be described with reference to FIG. 11. The pin wheel 45 shown in FIG. 11 includes the plate 45J and the pins 45A to 45H provided in the rotation direction of the plate 45J. The pins 45A to 45H are configured in the same manner as the pins 45A to 45H shown in FIG. 3. The pin wheel 45 in FIG. 11 does not include the plate 45K in FIG. 2. The driver blade 25 and the plate 45J are arranged at an interval in the direction of the axis line A2. Convex portions 62A to 62H are provided on a surface 62 of the driver blade 25 closer to the pin wheel 45. The convex portions 62A to 62H are provided at constant intervals in the direction of the center line A1. As shown in FIG. 12, protrusion amounts H4 of the convex portions 62A to 62H from the surface 62 are all the same.

Figure 11:
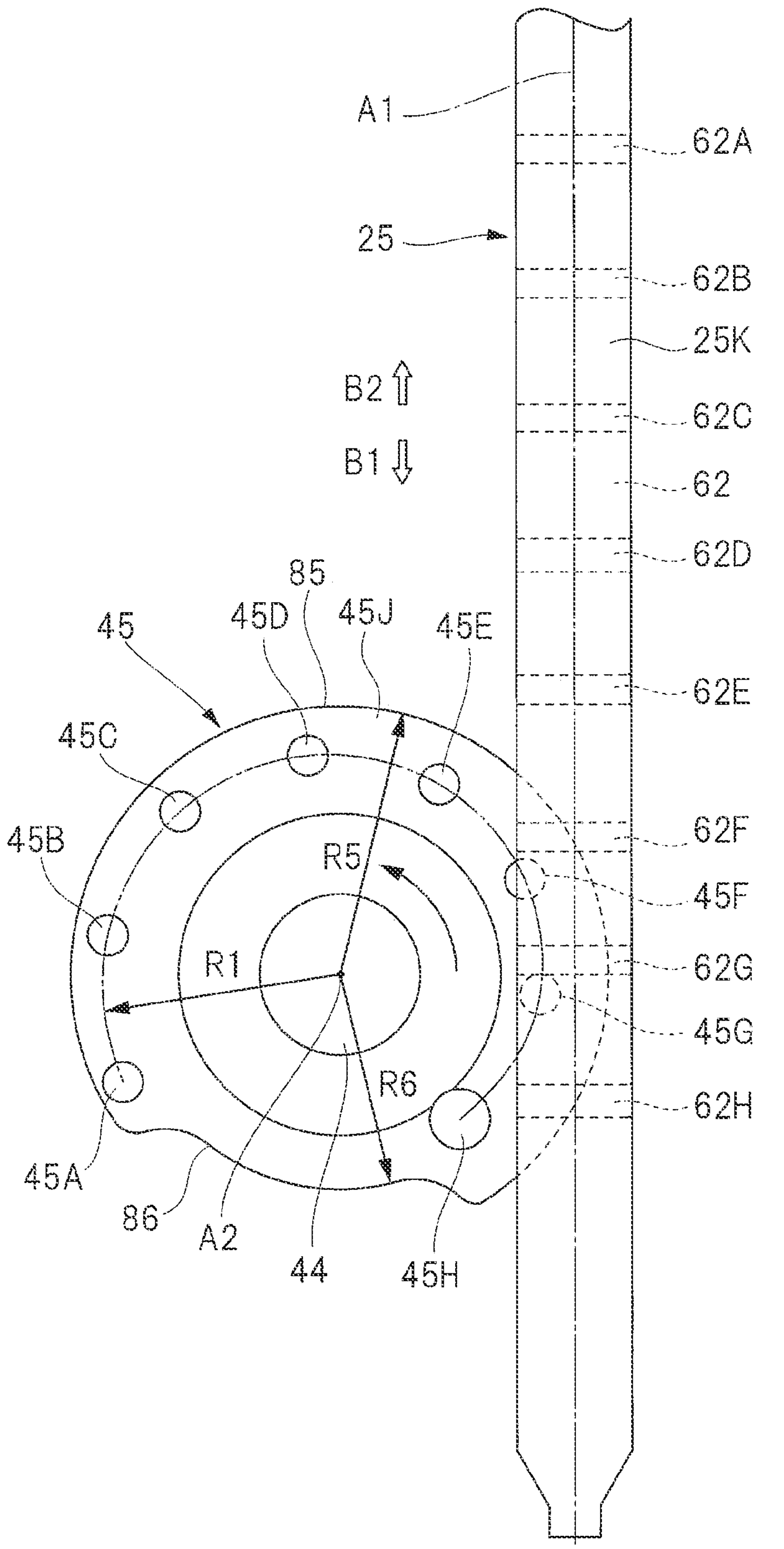
FIG. 11 is a cross-sectional view showing still another specific example of a pin wheel and a driver blade provided in the driver.
Figure 12:
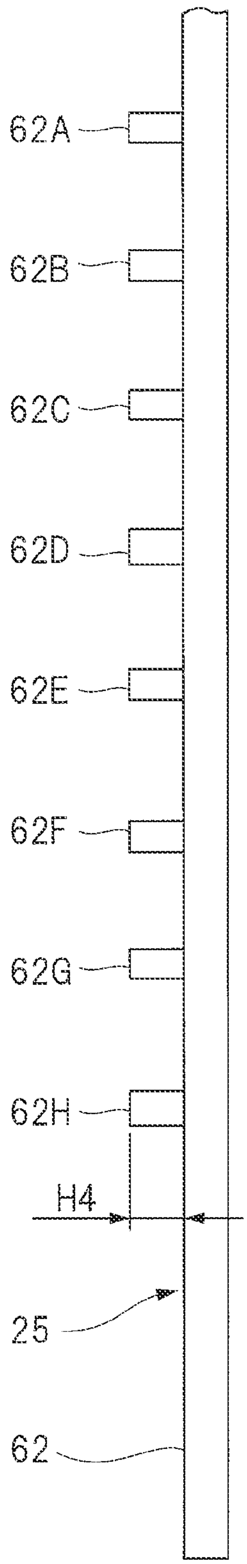
FIG. 12 is a diagram showing the driver blade of FIG. 11.

When the driver blade 25 shown in FIG. 11 is used as the striking mechanism 12 in FIG. 2, the pin 45G is engaged with the convex portion 62G, and the striking mechanism 12 is stopped at the standby position. Then, when the pin wheel 45 is rotated in the counterclockwise direction in FIG. 11, the pin 45H is engaged with the convex portion 62H and the pin 45G is then released from the convex portion 62G, and the striking mechanism 12 reaches the top dead center. Further, when the pin 45H is released from the convex portion 62H, the striking mechanism 12 falls and strikes the fastener and the striking mechanism 12 reaches the bottom dead center.

When the striking mechanism 12 reaches the bottom dead center and the pin wheel 45 is then rotated in the counterclockwise direction in FIG. 11, the pin 45A is engaged with the convex portion 62A, and the striking mechanism 12 rises from the bottom dead center. When the pin 45B is engaged with and released from the convex portion 62B, the pin 45C is engaged with and released from the convex portion 62C, the pin 45D is engaged with and released from the convex portion 62D, the pin 45E is engaged with and released from the convex portion 62E, the pin 45F is engaged with and released from the convex portion 62F, the pin 45G is engaged with the convex portion 62G, and the striking mechanism 12 reaches the standby position, the pin wheel 45 is stopped. The same effect as that of the embodiment shown in FIG. 3 to FIG. 8 can be obtained also in the pin wheel 45 and the driver blade 25 shown in FIG. 11.

Second Embodiment

Figure 13:
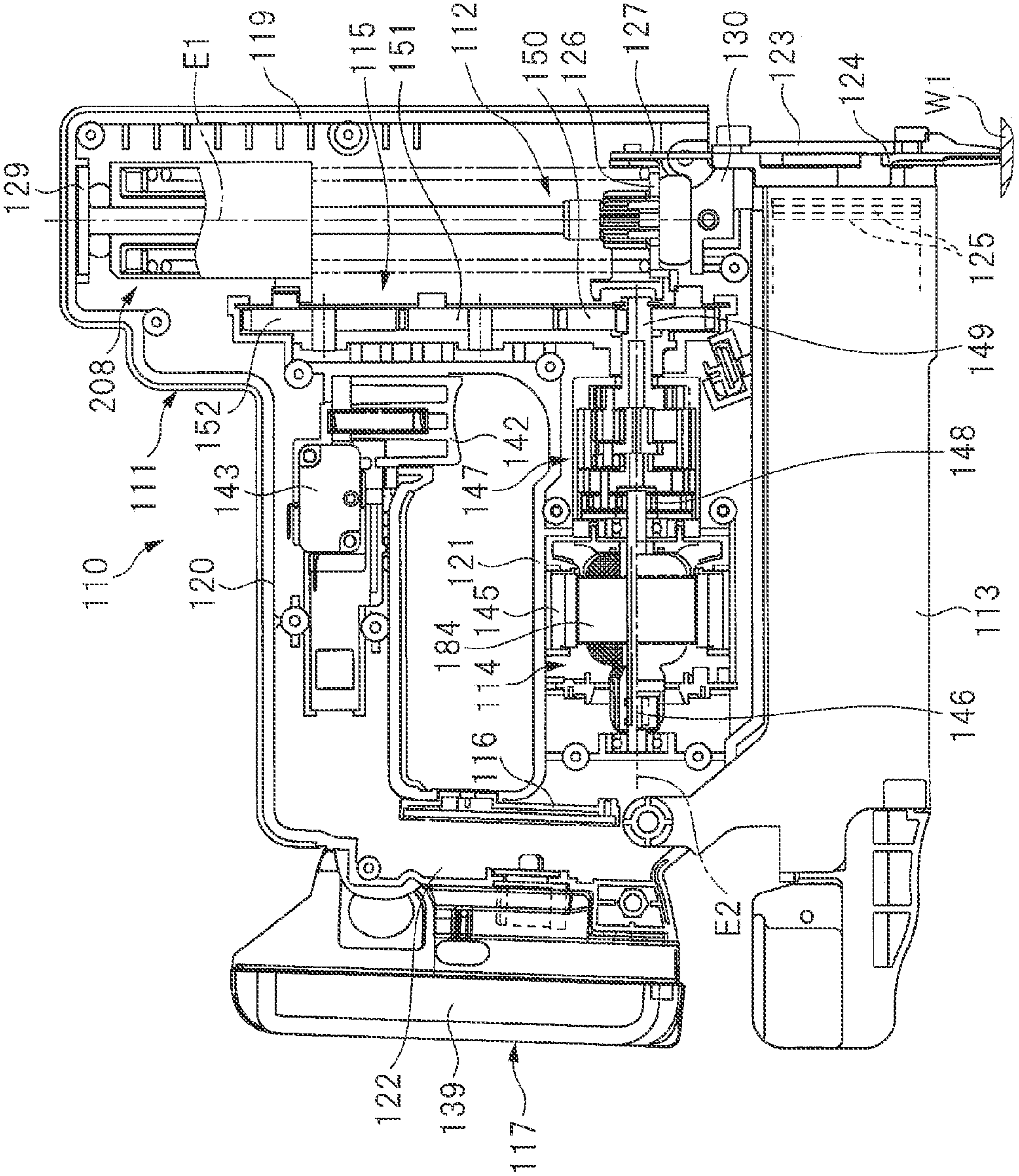
FIG. 13 is an overall cross-sectional view in which a driver according to a second embodiment is seen from a side.

A driver 110 shown in FIG. 13 includes a housing 111, a striking mechanism 112, a magazine 113, an electric motor

114, a conversion mechanism 115, a control board 116, a battery pack 117, and a reaction absorption mechanism 208. The housing 111 has a cylindrical body portion 119, a handle 120 connected to the body portion 119, and a motor case 121 connected to the body portion 119. An attaching portion 122 is connected to the handle 120 and the motor case 121. An injection portion 123 is provided outside the body portion 119, and the injection portion 123 is fixed to the body portion 119. The injection portion 123 has an injection path 124. The user can hold the handle 120 with a hand and press the tip of the injection portion 123 to the workpiece W1.

The magazine 113 is supported by the motor case 121 and the injection portion 123. The motor case 121 is disposed between the handle 120 and the magazine 113 in a direction of a center line E1. The magazine 113 contains a plurality of fasteners 125. Examples of the fasteners 125 include nails, and examples of the material of the fasteners 125 include metal, non-ferrous metal, and steel. The fasteners 125 are connected to each other by a connecting element. The connecting element may be any one of a wire, an adhesive, and a resin. The fastener 125 has a rod-like shape. The magazine 113 includes a feeder. The feeder sends the fastener 125 contained in the magazine 113 to the injection path 124.

The striking mechanism 112 is provided from the inside to the outside of the body portion 119. The striking mechanism 112 includes a plunger 126 disposed in the body portion 119 and a driver blade 127 fixed to the plunger 126. The plunger 126 is made of metal or synthetic resin.

Figure 14:
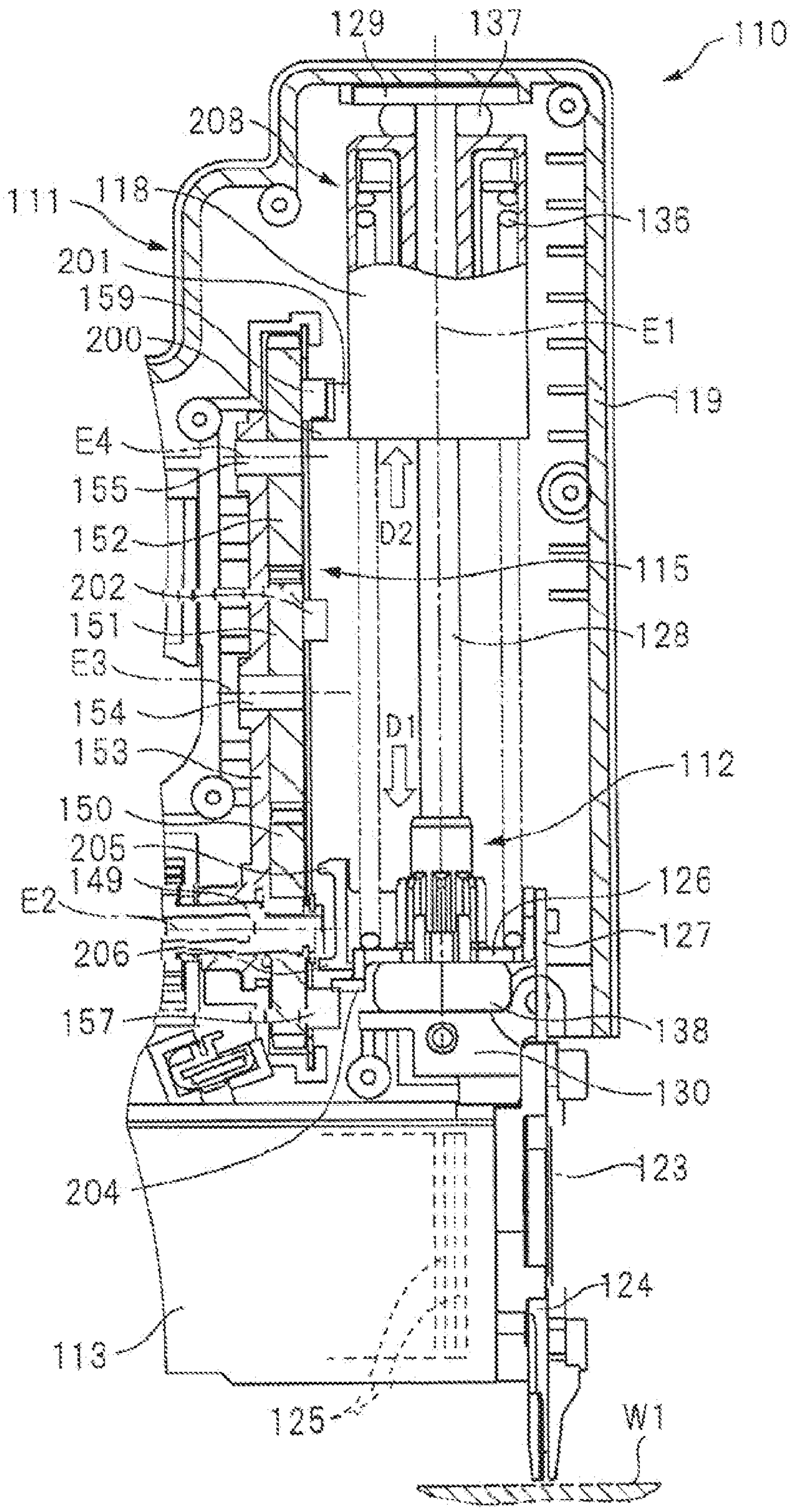
FIG. 14 is a partial cross-sectional view of the driver of FIG. 13.

The driver blade 127 is made of metal. A guide shaft 128 is provided in the body portion 119. The center line E1 passes through the center of the guide shaft 128. A material of the guide shaft 128 may be any one of metal, non-ferrous metal, and steel. As shown in FIG. 13 and FIG. 14, a top holder 129 and a bottom holder 130 are fixed and provided in the housing 111. A material of the top holder 129 and the bottom holder 130 may be any one of metal, non-ferrous metal, and steel. The guide shaft 128 is fixed to the top holder 129 and the bottom holder 130. Guide bars are provided in the body portion 119. Two guide bars are provided and the two guide bars are fixed to the top holder 129 and the bottom holder 130. The two guide bars both have a plate-like shape and are disposed in parallel to the center line E1.

The plunger 126 is attached to an outer circumferential surface of the guide shaft 128, and the plunger 126 is operable in the direction of the center line E1 along the guide shaft 128. The guide shaft 128 positions the plunger 126 about the center line E1 in the radial direction. The guide bar positions the plunger 126 about the center line E1 in the circumferential direction. The driver blade 127 is operable in parallel to the center line E1 together with the plunger 126. The driver blade 127 is operable in the injection path 124.

Figure 15:
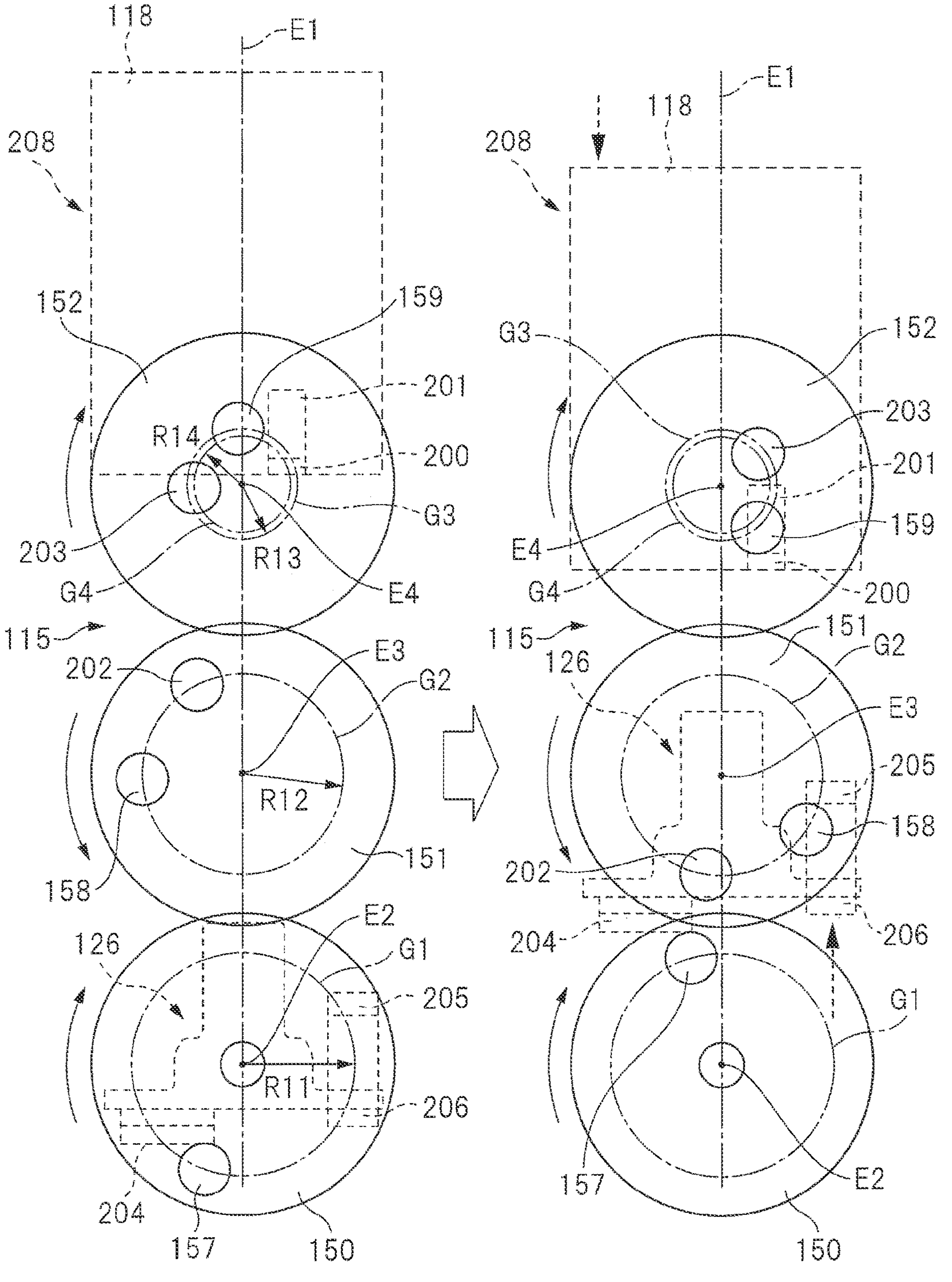
FIG. 15 is a schematic diagram showing an operation of a plunger and a weight of the driver of FIG. 13.

The reaction absorption mechanism 208 absorbs the reaction received by the housing 111. As shown in FIG. 14 and FIG. 15, the reaction absorption mechanism 208 includes a cylindrical weight 118 and engaging portions 200 and 201 provided to the weight 118. A material of the weight 118 may be any one of metal, non-ferrous metal, and steel. The weight 118 is attached to the guide shaft 128. The weight 118 is operable in the direction of the center line E1 along the guide shaft 128. The guide shaft 128 positions the weight 118 with respect to the center line E1 in the radial direction. The guide bar positions the weight 118 about the center line E1 in the circumferential direction.

A spring 136 is disposed in the body portion 119, and the spring 136 is disposed between the plunger 126 and the weight 118 in the direction of the center line E1. For example, a compression coil spring made of metal may be used as the spring 136. The spring 136 can expand and contract in the direction of the center line E1. A first end portion of the spring 136 in the direction of the center line E1 is in direct or indirect contact with the plunger 126. A second end portion of the spring 136 in the direction of the center line E1 is in direct or indirect contact with the weight 118. The spring 136 accumulates the elastic energy by receiving the compression force in the direction of the center line E1. The spring 136 is an example of a biasing mechanism configured to bias the striking mechanism 112 and the weight 118.

The plunger 126 receives the biasing force in a first direction D1 approaching to the bottom holder 130 in the direction of the center line E1 from the spring 136. The weight 118 receives a biasing force in a second direction D2 approaching to the top holder 129 in the direction of the center line E1 from the spring 136. The first direction D1 and the second direction D2 are opposite to each other, and the first direction D1 and the second direction D2 are parallel to the center line E1. The plunger 126 and the weight 118 receive a biasing force from the spring 136 that is physically the same element.

A weight bumper 137 and a plunger bumper 138 are provided in the body portion 119. The weight bumper 137 is disposed between the top holder 129 and the weight 118. The plunger bumper 138 is disposed between the bottom holder 130 and the plunger 126. The weight bumper 137 and the plunger 138 are both made of synthetic rubber.

The driver 110 shown in FIG. 13 and FIG. 14 shows an example in which the center line E1 is parallel to the vertical line. The operation in which the striking mechanism 112, the plunger 126, or the weight 118 is moved in the first direction D1 is referred to as falling. The operation in which the striking mechanism 112 or the weight 118 is moved in the second direction D2 is referred to as rising. The striking mechanism 112 and the weight 118 can reciprocate in the direction of the center line E1.

The battery pack 117 shown in FIG. 13 can be detachably attached to the attaching portion 122. The battery pack 117 includes a container case 139 and a plurality of battery cells contained in the container case 139. The battery cell is a secondary battery that can be charged and discharged, and any of a lithium ion battery, a nickel hydride battery, a lithium ion polymer battery, and a nickel cadmium battery can be used as the battery cell. The battery pack 117 is a DC power source and the power of the battery pack 117 can be supplied to the electric motor 114.

The control board 116 shown in FIG. 13 is provided in the attaching portion 122, and a controller 140 and an inverter circuit 141 shown in FIG. 6 are provided on the control board 116. The controller 140 is a microcomputer including an input port, an output port, a central processing unit, and a memory unit. The inverter circuit 141 includes a plurality of switching elements, and each of the plurality of switching elements can be individually switched on and off. The controller 140 outputs a signal to control the inverter circuit 141. An electric circuit is formed between the battery pack 117 and the electric motor 114. The inverter circuit 141 is a part of the electric circuit and is configured to connect and disconnect the electric circuit.

As shown in FIG. 13, a trigger 142 and a trigger switch 143 are provided to the handle 120, and the trigger switch 143 is turned on when the user applies an operation force to the trigger 142. The trigger switch 143 is turned off when the user releases the operation force applied to the trigger 142.

A position detection sensor 144 is provided in the housing 111. The position detection sensor 144 estimates the positions of the plunger 126 and the weight 118 in the direction of the center line E1 based on, for example, a rotation angle of the electric motor 114 and outputs a signal. The driver 110 shown in FIG. 13 does not include the push switch 60 shown in FIG. 6. The controller 140 receives the signal of the trigger switch 143 and the signal of the position detection sensor 144, and outputs the signal to control the inverter circuit 141.

The electric motor 114 shown in FIG. 13 includes a rotor 184 and a stator 145, and a motor shaft 146 is attached to the rotor 184. The motor shaft 146 is rotated when the power is supplied from the battery pack 117 to the electric motor 114. A speed reducer 147 is disposed in the motor case 121. The speed reducer 147 includes several pairs of planetary gear mechanisms, an input element 148, and an output element 149. The input element 148 is connected to the motor shaft 146. The electric motor 114 and the speed reducer 147 are concentrically disposed about the center line E1. The driver 110 shown in FIG. 13 shows an example in which an angle formed between the center line E1 and an axis line E2 is 90 degrees.

The conversion mechanism 115 converts the rotational force of the output element 149 into the operation force of the striking mechanism 112 and the operation force of the weight 118. The conversion mechanism 115 includes a first gear 150, a second gear 151, and a third gear 152. A material of the first gear 150, the second gear 151, and the third gear 152 may be any one of metal, non-ferrous metal, and steel. A holder 153 is provided in the housing 111, and the output element 149 is rotatably supported by the holder 153. The first gear 150 is fixed to the output element 149. The second gear 151 is rotatably supported by a supporting shaft 154. The third gear 152 is rotatably supported by a supporting shaft 155. The supporting shafts 154 and 155 are attached to the holder 153. The first gear 150 is rotatable about the axis line E2, the second gear 151 is rotatable about an axis line E3, and the third gear 152 is rotatable about an axis line E4.

As shown in FIG. 14, the axis lines E2, E3, and E4 are disposed at intervals in the direction of the center line E1. The axis line E3 is disposed between the axis line E2 and the axis line E4. The axis lines E2, E3, and E4 are parallel to each other. The third gear 152 is disposed between the second gear 151 and the top holder 129 in the direction of the center line E1. The first gear 150 is disposed between the second gear 151 and the magazine 113 in the direction of the center line E1.

As shown in FIG. 15, an outer diameter of the first gear 150, an outer diameter of the second gear 151, and an outer diameter of the third gear 152 are the same. The second gear 151 is meshed with the first gear 150 and the third gear 152. A cam roller 157 is provided to the first gear 150, two cam rollers 158 and 202 are provided to the second gear 151, and two cam rollers 159 and 203 are provided to the third gear 152. The cam roller 157 can rotate with respect to the first gear 150. The two cam rollers 158 and 202 are disposed on the same circumference about the axis line E3. Each of the two cam rollers 158 and 202 can rotate with respect to the second gear 151. A virtual circle G1 passing through the rotation center of the cam roller 157 has a radius R11. A virtual circle G2 passing through the rotation centers of the cam rollers 158 and 202 has a radius R12. The virtual circle G1 is centered on the axis line E2, and the virtual circle G2 is centered on the axis line E3. The radius R12 is smaller than the radius R11.

The two cam rollers 159 and 203 can rotate with respect to the third gear 152. A virtual circle G3 passing through the cam roller 159 has a radius R13. A virtual circle G4 passing through the cam roller 203 has a radius R14. The virtual circles G3 and G4 are both centered on the axis line E4. The radius R14 is smaller than the radius R13. The radii R13 and R14 are smaller than the radius R12. As described above, the radius R11 and the radius R12 are different from each other, and the radius R13 and the radius R14 are different from each other.

Examples of the material of the cam rollers 157, 158, 159, 202, and 203 include metal, non-ferrous metal, and steel. It is supposed that the cam rollers 157, 158, 159, 202, and 203 have a cylindrical shape and outer diameters of the cam rollers 157, 158, 159, 202, and 203 are all the same.

When the power of the battery pack 117 is supplied to the electric motor 114 and the motor shaft 146 is rotated forward, the rotational force of the motor shaft 146 is transmitted to the first gear 150 through the speed reducer 147. When the first gear 150 is rotated in the clockwise direction in FIG. 15, the second gear 151 is rotated in the counterclockwise direction and the third gear 152 is rotated in the clockwise direction.

As shown in FIG. 15, engaging portions 204, 205, and 206 are provided to the plunger 126. When the first gear 150 is rotated in the clockwise direction in FIG. 15, the cam roller 157 can be engaged with and released from the engaging portion 204. When the second gear 151 is rotated in the counterclockwise direction, the cam roller 158 can be engaged with and released from the engaging portion 205 and the cam roller 202 can be engaged with and released from the engaging portion 206. When the third gear 152 is rotated in the clockwise direction, the cam roller 159 can be engaged with and released from the engaging portion 200 and the cam roller 203 can be engaged with and released from the engaging portion 201.

Next, an example of using the driver 110 will be described. When the controller 140 detects the trigger switch 143 being turned off, the controller 140 does not supply the power to the electric motor 114 and stops the motor shaft 146. When the electric motor 114 is stopped, the plunger 126 is stopped at the position in contact with the plunger bumper 138, that is, the bottom dead center as shown in FIG. 14. Also, the weight 118 is biased by the elastic force of the spring 136 and is stopped at the position in contact with the weight bumper 137, that is, the top dead center. The controller 140 estimates the positions of the plunger 126 and the weight 118 in the direction of the center line E1 by processing the signal of the position detection sensor 144.

When the user presses the tip of the injection portion 123 to the workpiece W1 and the controller 140 detects the trigger switch 143 being turned on, the controller 140 supplies the power to the electric motor 114 to rotate the motor shaft 146 forward. The rotational force of the motor shaft 146 is amplified by the speed reducer 147 and transmitted to the first gear 150, and the first gear 150 is rotated in the clockwise direction as shown on the left side of FIG. 15.

When the first gear 150 is rotated in the clockwise direction, the second gear 151 is rotated in the counterclockwise direction and the third gear 152 is rotated in the clockwise direction. When the first gear 150 is rotated in the clockwise direction and the cam roller 157 is engaged with the engaging portion 204, the plunger 126 is operated in the second direction D2 against the biasing force of the spring 136 as shown on the right side of FIG. 15. Namely, the striking mechanism 112 rises. Also, when the third gear 152 is rotated in the clockwise direction and the cam roller 259 is engaged with the engaging portion 200, the weight 118 is operated in the first direction D1. Namely, the weight 118 falls as shown on the right side of FIG. 15.

Further, in the state where the cam roller 157 is engaged with the engaging portion 204, the cam roller 158 is engaged with the engaging portion 205. Thereafter, the cam roller 157 is released from the engaging portion 204. Also, as shown on the left side of FIG. 16, in the state where the cam roller 158 is engaged with the engaging portion 205, the cam roller 202 is engaged with the engaging portion 206. Therefore, the striking mechanism 12 further rises.

Also, as shown on the right side of FIG. 15, in the state where the cam roller 159 is engaged with the engaging portion 200, the cam roller 203 is engaged with the engaging portion 201. Next, as shown on the left side of FIG. 16, the cam roller 159 is released from the engaging portion 200. Therefore, the weight 118 further falls.

Figure 16:
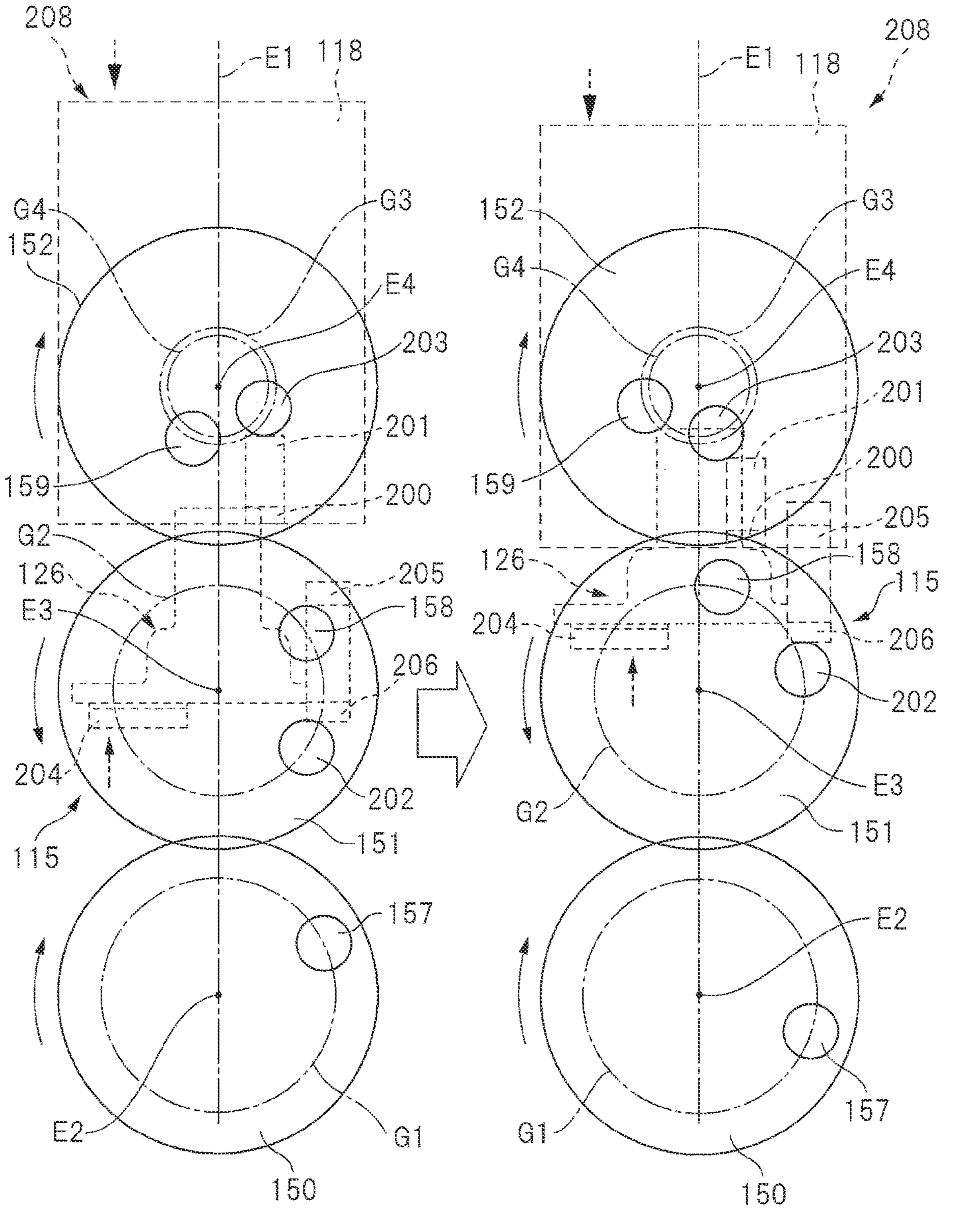
FIG. 16 is a schematic diagram showing a state where the plunger and the weight of the driver of FIG. 13 are further operated from the positions of FIG. 15.
Figure 17:
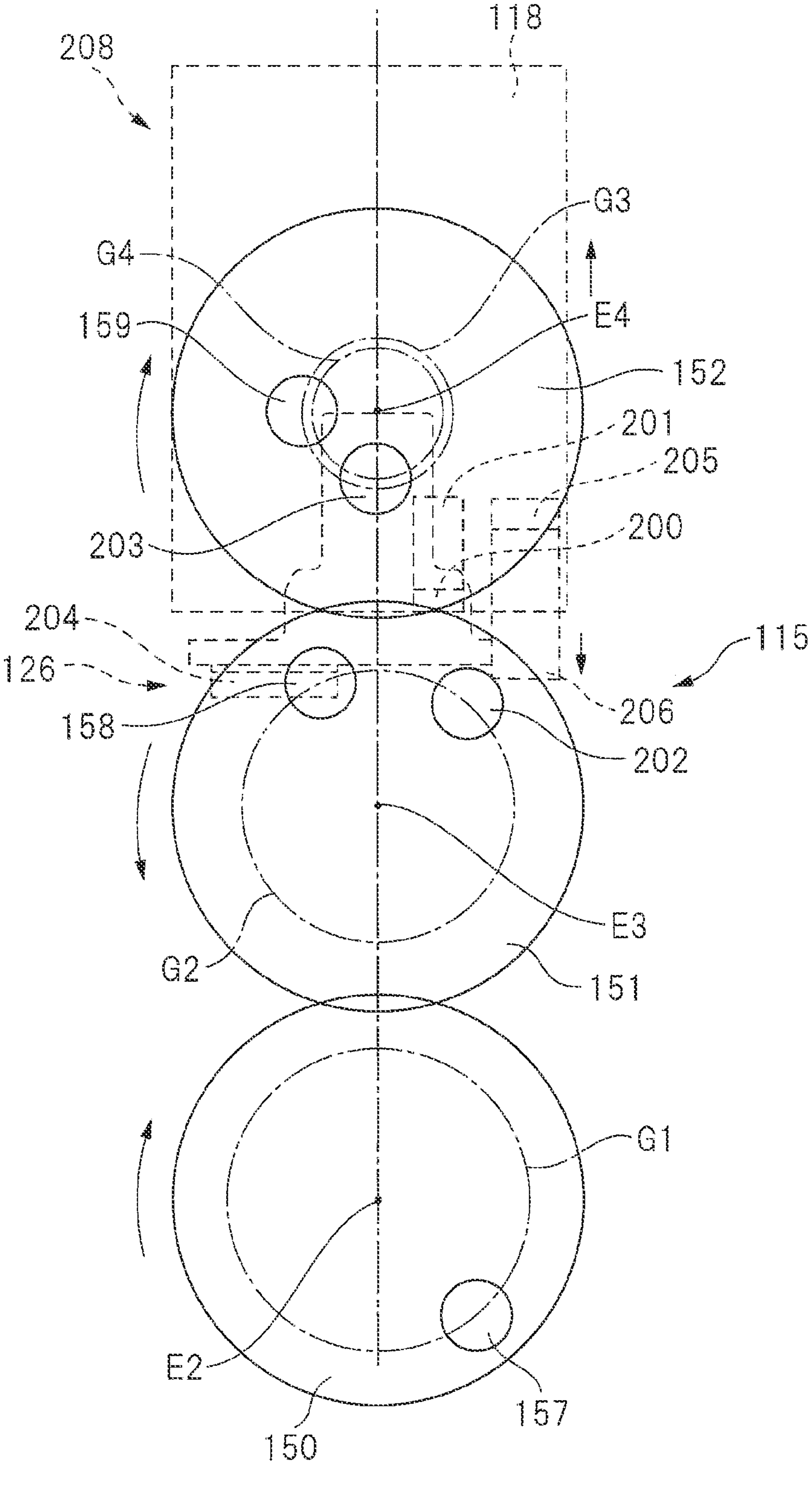
FIG. 17 is a schematic diagram showing a state where the plunger and the weight of the driver of FIG. 13 are further operated from the positions of FIG. 16.

Then, when the plunger 126 reaches the top dead center and the cam roller 202 is released from the engaging portion 206 as shown on the right side of FIG. 16, the plunger 126 falls by the biasing force of the spring 136 as shown in FIG. 17. Also, when the weight 118 reaches the bottom dead center and the cam roller 203 is released from the engaging portion 201 as shown on the right side of FIG. 16, the weight 118 rises by the biasing force of the spring 136 as shown in FIG. 17.

When the plunger 126 falls, that is, the striking mechanism 112 falls, the driver blade 127 strikes the fastener 125 located in the injection path 124. The fastener 125 is driven into the workpiece W1. After the driver blade 127 strikes the fastener 125, the plunger 126 collides with the plunger bumper 138. The plunger bumper 138 absorbs a part of the kinetic energy of the striking mechanism 112. Also, the weight 118 collides with the weight bumper 137. The weight bumper 137 absorbs a part of the kinetic energy of the reaction absorption mechanism 208.

As described above, when the striking mechanism 112 is operated in the first direction D1 to strike the fastener 125, the weight 118 is operated in the second direction D2 opposite to the first direction D1. Therefore, it is possible to reduce the reaction at the time when the striking mechanism 112 strikes the fastener 125.

The controller 140 estimates the position of the plunger 126 in the direction of the center line E1 and stops the electric motor 114 from when the plunger 126 starts to fall to when the plunger 126 collides with the plunger bumper 138. Therefore, the plunger 126 is stopped at the bottom dead center in contact with the plunger bumper 138, and the weight 118 is stopped at the top dead center in contact with the weight bumper 137. Then, when the user releases the operation force to the trigger 142 and applies the operation force to the trigger 142 again, the controller 140 rotates the electric motor 114, and the striking mechanism 112 and the weight 118 are operated in the same manner as described above.

When the plunger 126 rises against the biasing force of the spring 136, the element to transmit the torque of the electric motor 114 to the plunger 126 is switched from the cam roller 157 to the cam rollers 158 and 202. Here, the radius R12 is smaller than the radius R11. Therefore, when the striking mechanism 112 rises by the torque of the electric motor 114, the arm of the moment becomes shorter as the striking mechanism 112 approaches to the top dead center. Accordingly, it is possible to suppress the increase in the load torque of the electric motor 114 when the striking mechanism 112 approaches to the top dead center. Note that the torque applied from the striking mechanism 112 to the first gear 150 is counterclockwise in FIG. 15 and FIG. 16.

Also, when the weight 118 falls against the biasing force of the spring 136, the element to transmit the torque of the electric motor 114 to the weight 118 is switched from the cam roller 159 to the cam roller 203. Here, the radius R14 is smaller than the radius R13. Therefore, when the weight 118 falls by the torque of the electric motor 114, the arm of the moment becomes shorter as the weight 118 approaches to the bottom dead center. Accordingly, it is possible to suppress the increase in the load torque of the electric motor 114 when the weight 118 approaches to the bottom dead center. Note that the torque applied from the reaction absorption mechanism 208 to the first gear 150 through the third gear 152 and the second gear 151 is counterclockwise in FIG. 15 and FIG. 16.

Figure 18:
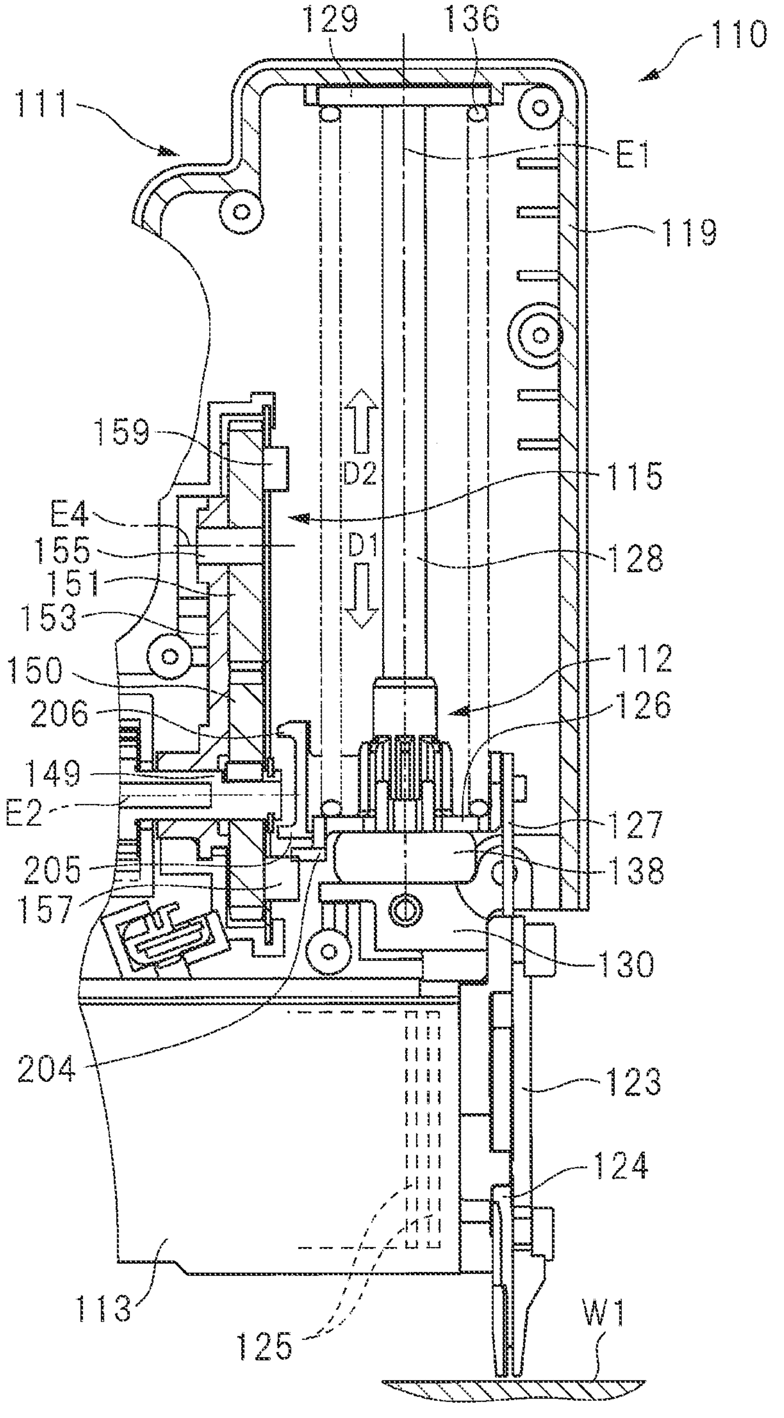
FIG. 18 is a cross-sectional view showing another example of the driver according to the second embodiment.

The driver 110 shown in FIG. 18 shows the example in which the reaction absorption mechanism 208 shown in FIG. 13 and FIG. 14 is not provided. The driver 110 shown in FIG. 18 can obtain the same function and effect as those of the driver 110 shown in FIG. 13 and FIG. 14 except the operation of the reaction absorption mechanism 208.

Third Embodiment

Figure 19:
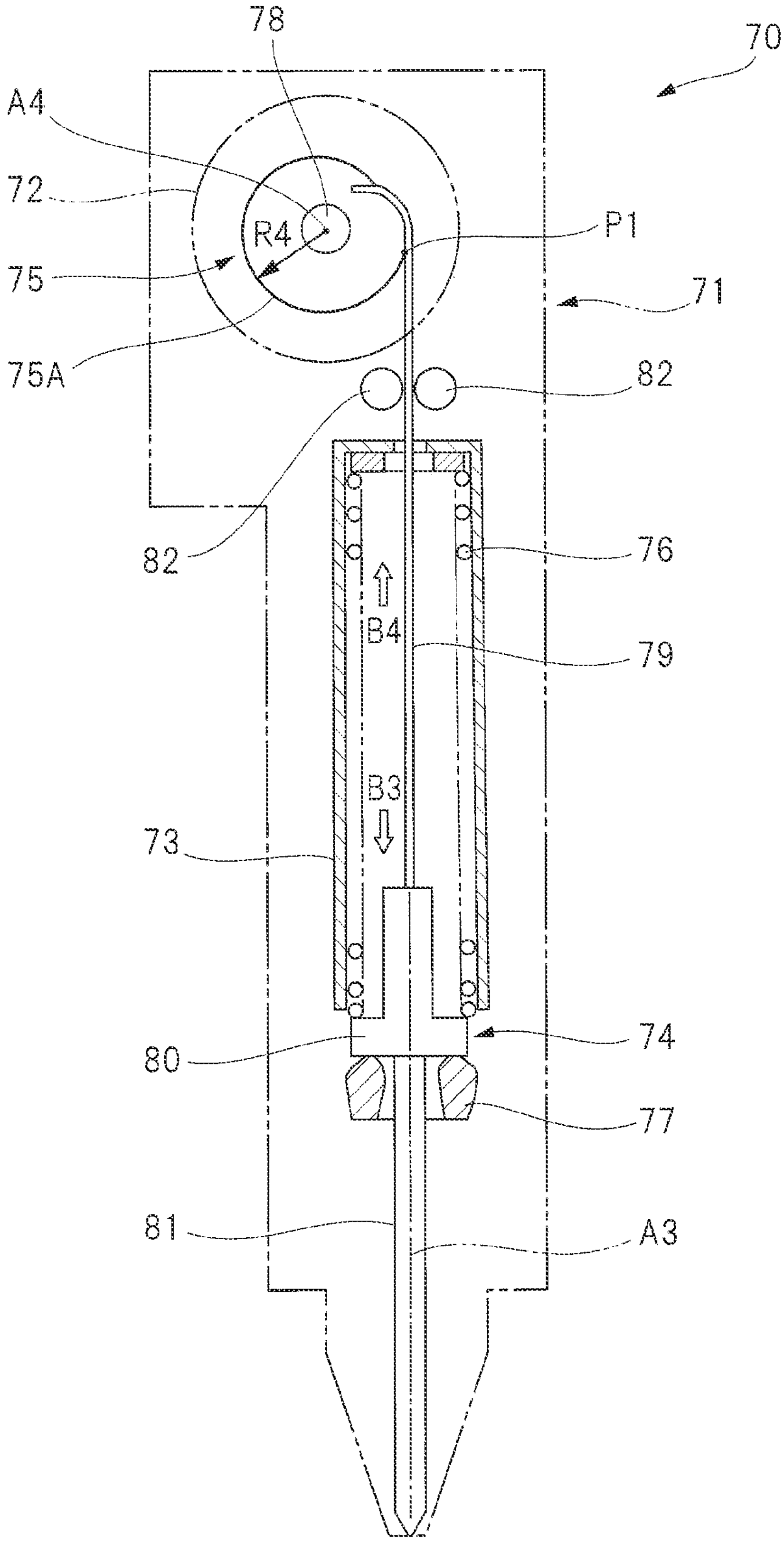
FIG. 19 is a schematic diagram showing a driver according to a third embodiment.

FIG. 19 is a schematic diagram showing a driver according to the third embodiment. A driver 70 includes a housing 71, an electric motor 72, a cylinder 73, a striking mechanism 74, a cam 75, a spring 76, and a bumper 77. The electric motor 72, the cylinder 73, the cam 75, the spring 76, and the bumper 77 are provided in the housing 71. The cylinder 73 is fixed and provided in the housing 71, and the striking mechanism 74 is movable in a direction of a center line A3. The striking mechanism 74 includes a piston 80 and a driver blade 81. The spring 76 is a compression spring made of metal, and the spring 76 is disposed in the cylinder 73 in the compressed state. The spring 76 biases the striking mechanism 74 by the elastic restoring force in a first direction B3, that is, in the direction approaching to the bumper 77. FIG. 19 shows the state where the piston 80 is pressed to the bumper 77 and the striking mechanism 77 is located at the bottom dead center.

The cam 75 is attached to a rotary shaft 78, and a clutch configured to connect and disconnect the power transmission path between the rotary shaft 78 and the electric motor 72 is provided. When the clutch is connected, the cam 75 is rotated in the counterclockwise direction by the torque of the electric motor 72. A winding portion 75A is formed on an outer circumferential surface of the cam 75. A radius from an axis line A4 to the winding portion 75A, that is, a radius R4 differs in the rotation direction of the cam 75.

A pair of guide rollers 82 is provided in the housing 71. A first end portion of a wire 79 is connected to the cam 75, and a second end portion of the wire 79 is connected to the piston 80. The wire 79 passes between the pair of guide rollers 82.

A phase detection sensor configured to detect a phase of the cam 75 in the rotation direction is provided in the housing 71. A controller configured to control the rotation and the stop of the electric motor 72 is provided in the housing 71. The signal of the phase detection sensor is input to the controller. The controller controls the connection and the disconnection of the clutch.

In the driver 70 in FIG. 19, when the electric motor 72 is stopped, the striking mechanism 74 is pressed to the bumper 77 by the biasing force of the spring 76 and is stopped at the bottom dead center. When the electric motor 72 is rotated, the cam 75 is rotated in the counterclockwise direction in FIG. 19 and the wire 79 is wound around the winding portion 75A and pulled. When the wire 79 is pulled, the striking mechanism 74 is moved in a second direction B4, that is, the striking mechanism 74 rises. The controller disconnects the clutch when the striking mechanism 74 reaches the top dead center. Then, the striking mechanism 74 falls by the force of the spring 76 and strikes the fastener. When the striking mechanism 74 falls, the wire 79 is drawn out from the winding portion 75A. Thereafter, when the piston 80 collides with the bumper 77, the controller stops the electric motor 72 and the striking mechanism 74 is stopped at the bottom dead center.

When the cam 75 is rotated by the torque of the electric motor 72 to raise the striking mechanism 74, the radius R4 at a position P1 where the wire 79 is wound around the winding portion 75A becomes smaller as the striking mechanism 74 rises. Thus, the radius R4 from the axis line A4 to the position P1, that is, the arm of the moment becomes shorter as the striking mechanism 74 rises, and the pulling force transmitted from the cam 75 to the wire 79 is increased. Therefore, it is possible to suppress the increase in the load torque of the electric motor 72 when the striking mechanism 74 rises.

The meanings of the matters described in the drivers according to the first to third embodiments will be described. The pin wheel 45 and the cam 75 are examples of a first rotational element. The first gear 150 and the second gear 151 are examples of a second rotational element, and the third gear 152 is an example of a third rotational element. The pressure chamber 13 and the springs 76 and 136 are examples of a first moving mechanism, and the electric motors 15, 72, and 114 are examples of a motor. The main body portion 25K is an example of a first main body portion. The plunger 126 is an example of a second main body portion. The pin wheel 45, the cam 75, the first gear 150, and the second gear 151 are examples of a second moving mechanism. The spring 136 is an example of a third moving mechanism. The third gear 152 and the cam rollers 159 and 203 are examples of a fourth moving mechanism. The pins 45A to 45H, the winding portion 75A, and the cam rollers 157, 158, 159, 202, and 203 are examples of a torque suppression mechanism. The convex portions 25A to 25H and the convex portions 62A to 62H are examples of a plurality of first engaging portions. The pins 45A to 45H are examples of a plurality of second engaging portions. The engaging portions 204, 205, and 206 are examples of a third engaging portion. The cam rollers 157, 158 and 202 are examples of a fourth engaging portion. The engaging portions 200 and 201 are examples of a fifth engaging portion. The cam rollers 159 and 203 are examples of a sixth engaging portion. The pins 45F, 45G, and 45H are examples of a high load engaging portion, and the pins 45A to 45E are examples of a low load engaging portion. The top dead center is an example of a first position, and the bottom dead center is an example of a second position. The wire 79 is an example of a wire material, and the pins 45A to 45H and the winding portion 75A are examples of a transmitter. The axis line A2 is an example of a first axis line, and the axis lines E2 and E3 are examples of a second axis line. The axis line E4 is an example of a third axis line. The radii R1, R2, R3, R4, R5, F6, R11, R12, R13, and R14 are examples of a distance. The reaction absorption mechanism 208 is an example of a reaction absorption mechanism, and the weight 118 is an example of a weight.

The driver is not limited to those described in the first to third embodiments, and can be modified in various ways with the scope of the embodiments. For example, in the first to third embodiments, examples of the motor to move the striking mechanism in the second direction include a hydraulic motor and a pneumatic motor in addition to the electric motor. The electric motor may be either a brush motor or a brushless motor. The power source of the electric motor may be either a DC power source or an AC power source. Examples of the rotational element include a gear, a pulley, and a rotary shaft in addition to the pin wheel and the cam.

In the first embodiment, the protrusion amount of the first engaging portion with respect to the main body portion may be either the distance from the edge of the main body portion or the distance from the center line of the main body portion. The plurality of second engaging portions may be a plurality of teeth provided on an outer circumferential surface of the gear in addition to the plurality of pins provided to the rotational element. The distance from the axis line to the second engaging portion corresponds to the distance from the axis line to the tip of the tooth.

In the description of the first embodiment with reference to FIG. 3, FIG. 4, FIG. 5, FIG. 8, FIG. 9, FIG. 10, and FIG. 11, the pin wheel 45 is described as being rotated in the counterclockwise direction by the torque of the electric motor 15. On the other hand, the torque applied from the striking mechanism 12 to the pin wheel 45 is described as being clockwise.

In the second embodiment, the first moving mechanism and the third moving mechanism of the driver 110 may be separately provided or may be shared. In the driver 110 shown in FIG. 14, the spring 136 has a role as the first moving mechanism that biases the striking mechanism 112 in the first direction D1 and a role as the third moving mechanism that biases the reaction absorption mechanism 208 in the second direction D2. On the other hand, it is also possible to separately provide a metal spring as the first moving mechanism that biases the striking mechanism in the first direction and a metal spring as the third moving mechanism that biases the reaction absorption mechanism in the second direction.

In the second embodiment, there may be one second rotational element rotated about the second axis line or there may be a plurality of second rotational elements. When there is one rotational element, a plurality of fourth engaging portions are all provided to the one second rotational element, and the second rotational element can be rotated about one second axis line. When there are a plurality of second rotational elements, the fourth engaging portions are respectively provided to the plurality of second rotational elements. The plurality of second rotational elements can be rotated about respectively different second axis lines. One or more fourth engaging portions are respectively provided to the plurality of second rotational elements. The fourth engaging portions respectively provided to the plurality of second rotational elements have the different distances from the corresponding second axis lines which are the centers of the respective second rotational elements. Note that, when the plurality of fourth engaging portions are provided to one second rotational element, the distances from the second axis line which is the center of the second rotational element to the fourth engaging elements may be the same or different.

Further, it is also possible to adopt the configuration in which the rotation directions of the plurality of second rotational elements are the same in the driver according to the second embodiment. This can be implemented by, for example, winding a timing belt to the plurality of second rotational elements. In this case, the positions of the engaging portions provided to the second rotational elements, the radii of the engaging portions disposed in the second rotational elements, and the positions of the engaging portions provided to the striking mechanism are arbitrarily designed.

In the description of the second embodiment with reference to FIG. 15, FIG. 16, and FIG. 17, the example in which the first gear 150 is rotated in the clockwise direction by the torque of the electric motor 114 is described. On the other hand, the example in which the torque applied from the striking mechanism 112 to the first gear 150 is counterclockwise is described.

In the third embodiment, examples of the wire material include a wire, a cable, and a rope. In the third embodiment, the wire material may be wound around a pulley between the cam and the striking mechanism. In the description of the third embodiment with reference to FIG. 19, the example in which the cam 75 is rotated in the counterclockwise direction by the torque of the electric motor 72 is described. On the other hand, the example in which the torque applied from the striking mechanism 74 to the cam 75 is clockwise is described.

In the drawings for describing the first, second, and third embodiments, the clockwise direction and the counterclockwise direction are definitions used for convenience and other directions may be used as long as the directions are opposite directions.

Examples of the first moving mechanism configured to move the striking mechanism in the first direction include a gas spring, a metal spring, a non-ferrous metal spring, a magnetic spring, and a synthetic rubber. The pressure chamber 13 described in the first embodiment is an example of the gas spring. The metal spring and the non-ferrous metal spring may be either a compression spring or a tension spring. Examples of the metal described in the first, second, and third embodiments include iron and steel. Examples of the non-ferrous metal described in the first, second, third embodiments include aluminum.

The magnetic spring moves the striking mechanism in the first direction by the repulsive force between the same poles of the magnets. The synthetic rubber moves the striking mechanism in the first direction by the repulsive force of the synthetic rubber. The magnetic spring or the synthetic rubber is provided in the housing.

Further, the second moving mechanism may be configured by combining power transmission elements such as a pulley, a sprocket, a chain, a wire, a cable and others. The fourth moving mechanism may be configured by combining power transmission elements such as a pulley, a sprocket, a chain, a wire, a cable and others. Further, the first moving mechanism may be defined as a first biasing mechanism and the second moving mechanism may be defined as a second biasing mechanism. Moreover, the third moving mechanism may be defined as a third biasing mechanism and the fourth moving mechanism may be defined as a fourth biasing mechanism. The striking mechanism can be stopped at the standby position, and it is also possible to set the bottom dead center as the standby position of the striking mechanism.

Further, examples of the workpiece include a floor, a wall, a ceiling, a post, and a roof. Examples of a material of the workpiece include a wood, a concrete, and a plaster.

REFERENCE SIGNS LIST

10, 70, 110 . . . driver, 12, 74, 112 . . . striking mechanism, 13 . . . pressure chamber, 15, 72, 114 . . . electric motor, 25K . . . main body portion, 25A to 25H, 62A to 62H . . . convex portion, 45 . . . pin wheel, 45A to 45H . . . pin, 75 . . . cam, 75A . . . winding portion, 76, 136 . . . spring, 79 . . . wire, 85 . . . first region, 86 . . . second region, 118 . . . weight, 126 . . . plunger, 150 . . . first gear, 151 . . . second gear, 152 . . . third gear, 157, 158, 159, 202, 203 . . . cam roller, 200, 201, 204, 205, 206 . . . engaging portion, 208 . . . reaction absorption mechanism, A2, A4, E2, E3, E4 . . . axis line, B1, B3, D1 . . . first direction, B2, B4, D2 . . . second direction, H1, H2 . . . protrusion amount, R1, R2, R3, R4, R5, R6, R11, R12, R13, R14 . . . radius

The invention claimed is:

1. A driver comprising:

a striking mechanism operable to move in a first direction and a second direction opposite to the first direction;

a first moving mechanism configured to move the striking mechanism in the first direction to strike a fastener;

a motor; and a second moving mechanism configured to move the striking mechanism in the second direction against a force of the first moving mechanism, wherein the striking mechanism includes:

a main body portion extending in the first direction; and first engaging portions disposed on the main body portion, and spaced apart from each other in the first direction, wherein the second moving mechanism includes:

a rotational element rotated by the motor, the rotational element including a drive shaft extending in a third direction crossing the first and second directions, and a first support and a second support spaced apart from each other in the third direction; and second engaging portions disposed between the first support and the second support and spaced apart from each other in a rotation direction of the rotational element, the second engaging portions being engaged with and released from the first engaging portions, respectively, each second engaging portion having a pin shape, wherein the first engaging portions protruding from the main body portion in a direction intersecting with the first and second directions, wherein the first engaging portions include a first-first engaging portion having a first protrusion amount from a center line of the main body portion and a second-first engaging portion having a second protruding amount from the center line of the main body portion, the second protruding amount being greater than the first protrusion amount, the center line of the main body portion being parallel with the first direction, and wherein the first-first engaging portion and the second-first engaging portion are arranged in that order in the first direction.

2. The driver according to claim 1, wherein among the first engagement portions, the second-first engagement portion is a last one that engage with the second engaging portions when the striking mechanism moves in the second direction.

3. The driver according to claim 1, wherein the second engaging portions include a first-second engaging portion having a first outer diameter and a second-second engaging portion having a second outer diameter, the second outer diameter being greater than the first outer diameter, and wherein the first-second engaging portion and the second-second engaging portion are arranged in that order in the rotating direction.

4. The driver according to claim 3, wherein among the second engagement portions, the second-second engaging portion is a last one that engage with the first engaging portions when the striking mechanism moves in the second direction.

5. The driver according to claim 1, wherein the first engaging portions extend from the main body portion of the striking mechanism in a fourth direction crossing the first, second, and third directions.

6. The driver according to claim 1, wherein the first support has a first region and a second region that are arranged in the rotating direction, the second region being closer to the drive shaft than the first region, and wherein the second support has a third region and a fourth region that are arranged in the rotating direction, the fourth region being closer to the drive shaft than the third region.

7. The driver according to claim 1, wherein the first direction is a direction in which the striking mechanism moves from a first position to a second position, the second direction is a direction in which the striking mechanism moves from the second position to the first position, and wherein the driver further comprises a controller configured to, after striking the fastener, control the motor to drive the rotational element to engage the second engaging portions with the first engaging portions to move the striking mechanism in the second direction, and stop the striking mechanism at a standby position between the first position and the second position.

8. The driver according to claim 7, wherein, when the striking mechanism moves from the first position to the second position, the second engaging portions are located outside an area through which the first engaging portions pass, and wherein, when the striking mechanism is held in the standby position, at least two of the second engaging portions are located in the area.

9. The driver according to claim 1, wherein the first moving mechanism includes a pressure chamber configured to move the striking mechanism in the first direction using gas pressure.

10. A driver comprising:

a striking mechanism operable to move in a first direction and a second direction opposite to the first direction;

a first moving mechanism configured to move the striking mechanism in the first direction to strike a fastener;

a motor; and a second moving mechanism configured to move the striking mechanism in the second direction against a force of the first moving mechanism, wherein the striking mechanism includes:

a main body portion extending in the first direction; and first engaging portions disposed on the main body portion, and spaced apart from each other in the first direction, wherein the second moving mechanism includes:

a rotational element rotated by the motor; and second engaging portions spaced apart from each other in a rotation direction of the rotational element, the second engaging portions being engaged with and released from the first engaging portions, respectively, and wherein the first engaging portions protruding from the main body portion in a direction intersecting with the first and second directions, and wherein the first direction is a direction in which the striking mechanism moves from a first position to a second position, the second direction is a direction in which the striking mechanism moves from the second position to the first position, wherein the driver further comprises a controller configured to, after striking the fastener, control the motor to drive the rotational element to engage the second engaging portions with the first engaging portions to move the striking mechanism in the second direction, and stop the striking mechanism at a standby position between the first position and the second position, wherein the first engaging portions include a first-first engaging portion having a first protrusion amount from a center line of the main body portion and a second-first engaging portion having a second protruding amount from the center line of the main body portion, the second protruding amount being greater than the first protrusion amount, the center line of the main body portion being parallel with the first direction, and wherein the first-first engaging portion and the second-first engaging portion are arranged in that order in the first direction.

11. The driver according to claim 10, wherein the first engaging portions further include a third-first engaging portion, and wherein the third-first engaging portion has a third protrusion amount shorter than the first and second protrusion amounts of the first-first and second-first engaging portions.

12. The driver according to claim 10, wherein among the first engagement portions, the second-first engagement portion is a last one that engage with the second engaging portions when the striking mechanism moves in the second direction.

13. The driver according to claim 10, wherein when the striking mechanism is held in the standby position, one or more of the second engaging portions that are located in an intermediate part of the second engaging portions in the rotating direction engage with corresponding one or more of the first engaging portions that are located in an intermediate part of the first engaging portions in the first direction.

14. The driver according to claim 10, wherein, when the striking mechanism moves from the first position to the second position, the second engaging portions are located outside an area through which the first engaging portions pass, and wherein, when the striking mechanism is held in the standby position, at least two of the second engaging portions are located in the area.

15. The driver according to claim 10, wherein the plurality of second engaging portions include a first-second engaging portion having a first distance between a center of the drive shaft and a part of an outermost periphery of the first-second engaging portion, and a second-second engaging portion having a second distance between a center of the drive shaft and a part of an outermost periphery of the first-second engaging portion, the first distance is greater than the second distance, and wherein the first-second engaging portion and the second-second engaging portion are arranged in that order in the rotating direction.

16. The driver according to claim 10, wherein the first moving mechanism includes a pressure chamber configured to move the striking mechanism in the first direction using gas pressure.

17. A driver comprising:

a striking mechanism operable to move in a first direction and a second direction opposite to the first direction;

a first moving mechanism configured to move the striking mechanism in the first direction to strike a fastener;

a motor; and a second moving mechanism configured to move the striking mechanism in the second direction against a force of the first moving mechanism, wherein the striking mechanism includes:

a main body portion extending in the first direction; and first engaging portions disposed on the main body portion, and spaced apart from each other in the first direction, the second moving mechanism includes:

a rotational element rotated by the motor, the rotational element including a drive shaft extending in a third direction crossing the first and second directions; and second engaging portions spaced apart from each other in a rotation direction of the rotational element, the second engaging portions being engaged with and released from the first engaging portions, respectively, and wherein the first engaging portions protruding from the main body portion in a third direction intersecting with the first and second directions, and wherein the second engaging portions include a first-second engaging portion having a first distance between a center of the drive shaft and a part of an outermost periphery of the first-second engaging portion, and a second-second engaging portion having a second distance between a center of the drive shaft and a part of an outermost periphery of the first-second engaging portion, the first distance is greater than the second distance, and wherein the first-second engaging portion and the second-second engaging portion are arranged in that order in the rotating direction.

18. The driver according to claim 17, wherein among the second engagement portions, the second-second engaging portion is a last one that engage with the first engaging portions when the striking mechanism moves in the second direction.

19. The driver according to claim 17, wherein the main body portion has a center line parallel with the first direction, wherein the first engaging portions includes a first-first engaging portion having a first protrusion amount from the center line of the main body portion and a second-first engaging portion having a second protruding amount from the center line of the main body portion, the second protruding amount being greater than the first protrusion amount, and wherein the first-first engaging portion and the second-first engaging portion are arranged in that order in the first direction.

20. The driver according to claim 17, wherein the first moving mechanism includes a pressure chamber configured to move the striking mechanism in the first direction using gas pressure.

* * * * *